US012384363B2

(12) United States Patent
Noguchi et al.

(10) Patent No.: US 12,384,363 B2
(45) Date of Patent: Aug. 12, 2025

(54) DRIVER ASSISTANCE SYSTEM AND COMPUTER-READABLE RECORDING MEDIUM

(71) Applicant: SUBARU CORPORATION, Tokyo (JP)

(72) Inventors: Masaharu Noguchi, Tokyo (JP); Yui Ota, Tokyo (JP); Noeru Sato, Tokyo (JP); Tsuyoshi Yamasaki, Tokyo (JP); Ryuichi Sumikawa, Tokyo (JP)

(73) Assignee: SUBARU CORPORATION, Tokyo (JP)

( * ) Notice: Subject to any disclaimer, the term of this patent is extended or adjusted under 35 U.S.C. 154(b) by 185 days.

(21) Appl. No.: 18/179,765

(22) Filed: Mar. 7, 2023

(65) Prior Publication Data

US 2023/0303066 A1 Sep. 28, 2023

(30) Foreign Application Priority Data

Mar. 24, 2022 (JP) ................................. 2022-047939

(51) Int. Cl.
*B60W 30/09* (2012.01)
*B60W 30/095* (2012.01)

(52) U.S. Cl.
CPC ........ *B60W 30/09* (2013.01); *B60W 30/0956* (2013.01); *B60W 2552/00* (2020.02); *B60W 2554/4026* (2020.02); *B60W 2554/4029* (2020.02); *B60W 2554/4041* (2020.02)

(58) Field of Classification Search
CPC ............. B60W 30/09; B60W 30/0956; B60W 2554/4041; B60W 2552/00; B60W 2554/4026; B60W 2554/4029
See application file for complete search history.

(56) References Cited

U.S. PATENT DOCUMENTS

| 2013/0223686 | A1* | 8/2013 | Shimizu | G08G 1/166 382/103 |
| 2019/0118804 | A1 | 4/2019 | Toda et al. | |
| 2020/0377121 | A1* | 12/2020 | Gussner | B60W 50/14 |
| 2021/0295682 | A1* | 9/2021 | Inoue | H04W 4/021 |

FOREIGN PATENT DOCUMENTS

| JP | 2008-293099 A | 12/2008 |
| JP | 2019-79206 A | 5/2019 |

* cited by examiner

*Primary Examiner* — Navid Z. Mehdizadeh
*Assistant Examiner* — Oliver Tan
(74) *Attorney, Agent, or Firm* — Rimon P.C.

(57) ABSTRACT

A driver assistance system includes at least one processor and at least one memory communicably coupled to the processor. The processor is configured to acquire data regarding presence or absence of a passer-by in a blind spot region as viewed from a vehicle to be assisted. The presence or the absence of the passer-by is identified based on, at least, recognition results by object recognition systems including an object recognition system other than an object recognition system of the vehicle to be assisted. The processor is configured to calculate certainty of a recognition result of the presence or the absence of the passer-by based on, at least, the number of the object recognition systems that recognize the same passer-by, and carry out processing of reducing a risk of collision between the vehicle to be assisted and the passer-by, in accordance with the certainty calculated.

10 Claims, 11 Drawing Sheets

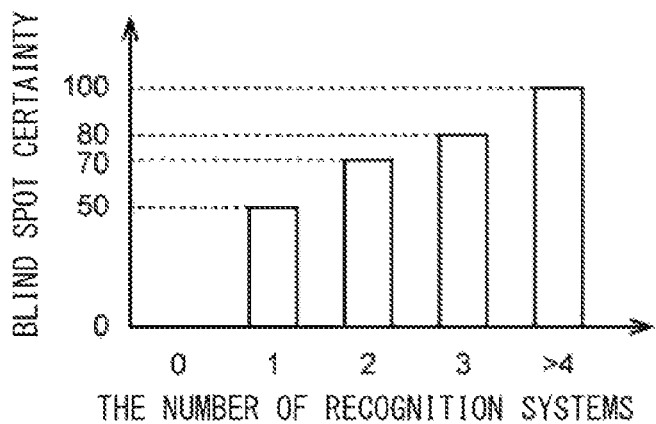
FIG. 4
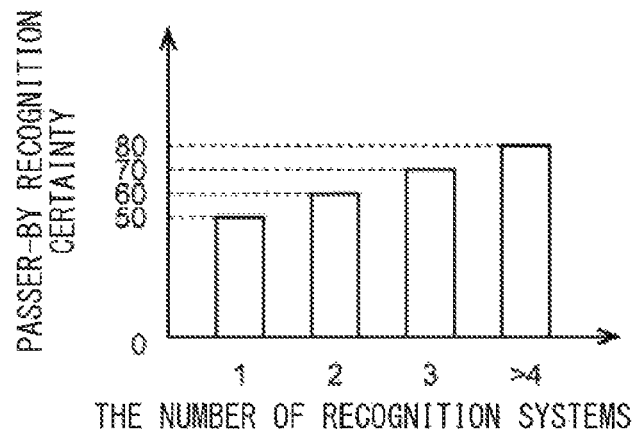
FIG. 5
| | ZERO TO FOCAL DISTANCE | FOCAL DISTANCE TO PREDETERMINED DISTANCE | PREDETERMINED DISTANCE TO RECOGNIZABLE DISTANCE |
|---|---|---|---|
| CAMERA | 0 | 20 | 10 |
| LiDAR | 10 | 10 | 0 |
FIG. 6

| PASSER-BY RECOGNITION CERTAINTY | BLIND SPOT CERTAINTY | NOTIFI- CATION | TRAVEL CONTROL CORRECTION |
|---|---|---|---|
| 71< | 51< | DONE | DONE |
|  | <50 | DONE | DONE |
| 50-70 | 51< | DONE | DONE |
|  | <50 | DONE | NOT DONE |
| <50 | 51< | NOT DONE | NOT DONE |
|  | <50 | DONE | DONE |

| PASSER-BY RECOGNITION CERTAINTY | BLIND SPOT CERTAINTY | LOCATION OF PASSER-BY | NOTIFI-CATION | TRAVEL CONTROL CORRECTION |
|---|---|---|---|---|
| 71< | — | A1 | DONE | DECELERATION AND TRACK CORRECTION |
| | | A2 | DONE | DECELERATION |
| 50-70 | 51< | A1 | DONE | DECELERATION AND TRACK CORRECTION |
| | | A2 | DONE | DECELERATION |
| | <50 | A1 | DONE | DECELERATION |
| | | A2 | DONE | NOT DONE |
| <50 | 51< | A1 | NOT DONE | NOT DONE |
| | | A2 | NOT DONE | NOT DONE |
| | <50 | A1 | DONE | DECELERATION AND TRACK CORRECTION |
| | | A2 | DONE | DECELERATION |

FIG. 14

DRIVER ASSISTANCE SYSTEM AND COMPUTER-READABLE RECORDING MEDIUM

CROSS-REFERENCE TO RELATED APPLICATIONS

The present application claims priority from Japanese Patent Application No. 2022-047939 filed on Mar. 24, 2022, the entire contents of which are hereby incorporated by reference.

BACKGROUND

The disclosure relates to a driver assistance system and a computer-readable recording medium containing a computer program that assist in driving a vehicle to reduce a risk of collision with a passer-by who rushes out of a blind spot region.

Recently, the practical application of vehicles equipped with a driver assistance function and an automated driving function has been promoted mainly for the purpose of reduction in traffic accidents and reduction in a burden of driving. For example, apparatuses have been known that detect an object present around the vehicle on the basis of data detected by various sensors and assist in driving the vehicle, to avoid collision between the vehicle and the object. The various sensors are, for example, a vehicle outside capturing camera and LiDAR (Light Detection and Ranging) provided in the vehicle. However, in some traffic accidents, there are phenomena that are difficult to avoid unless a preparatory action such as deceleration is taken assuming an unexpected incident in advance, e.g., a sudden rush out of a blind spot region.

Whereas, for example, Japanese Unexamined Patent Application Publication (JP-A) No. 2008-293099 describes a driver assistance apparatus that detects target data around a vehicle, and acquires target data around random vehicles detected by the random vehicles. The driver assistance apparatus extracts, from the acquired target data around the random vehicles, blind spot target data that is not included in the target data around the vehicle detected by a detector. The driver assistance apparatus notifies a driver who drives the vehicle of the blind spot target data extracted.

JP-A No. 2019-79206 describes a vehicle control apparatus that determines whether or not collision between a vehicle and each of structures and oncoming vehicles is avoidable, on the basis of a position of each of the structures and the oncoming vehicles. Even in a case where a determination is made that the collision between the vehicle and each of the structures and the oncoming vehicles is avoidable, when a state of a blind spot region behind the structure is unrecognizable, the vehicle control apparatus makes the vehicle stop until the oncoming vehicle passes by the vehicle.

SUMMARY

An aspect of the disclosure provides a driver assistance system configured to assist in driving a vehicle. The driver assistance system includes: one or more processors; and one or more memories communicably coupled to the one or more processors. The one or more processors are configured to acquire data regarding presence or absence of a passer-by in a blind spot region as viewed from the vehicle to be assisted. The presence or the absence of the passer-by is identified based on, at least, recognition results by object recognition systems including an object recognition system other than an object recognition system of the vehicle to be assisted. The one or more processors are configured to calculate certainty of a recognition result of the presence or the absence of the passer-by based on, at least, the number of the object recognition systems that recognize the same passer-by. The one or more processors are configured to carry out processing of reducing a risk of collision between the vehicle to be assisted and the passer-by, in accordance with the certainty calculated.

An aspect of the disclosure provides a computer-readable recording medium containing a program applicable to a driver assistance system configured to assist in driving a vehicle. The program causes, when executed by one or more processors, the one or more processors to implement processing. The processing includes acquiring data regarding presence or absence of a passer-by in a blind spot region as viewed from the vehicle to be assisted. The presence or the absence of the passer-by is identified based on, at least, recognition results by object recognition systems including an object recognition system other than an object recognition system of the vehicle to be assisted. The processing includes calculating certainty of a recognition result of the presence or the absence of the passer-by based on, at least, the number of the object recognition systems that recognize the same passer-by. The processing includes carrying out processing of reducing a risk of collision between the vehicle to be assisted and the passer-by, in accordance with the certainty calculated.

BRIEF DESCRIPTION OF THE DRAWINGS

The accompanying drawings are included to provide a further understanding of the disclosure, and are incorporated in and constitute a part of this specification. The drawings illustrate embodiments and, together with the specification, serve to explain the principles of the disclosure.

FIG. 4 is a diagram illustrating an example of blind spot certainty in accordance with the number of object recognition systems each having a range of recognition overlapping with a blind spot region.

FIG. 5 is a diagram illustrating an example of passer-by recognition certainty set in accordance with the number of the object recognition systems that recognize a passer-by.

FIG. 6 is a table summarizing examples of correction values set in accordance with the kinds of surrounding environment sensors and distances from the surrounding environment sensors to each passer-by.

FIG. 14 is a table summarizing a setting example of the contents of the countermeasures to be taken to reduce the risk of collision.

DETAILED DESCRIPTION

Figure 1:
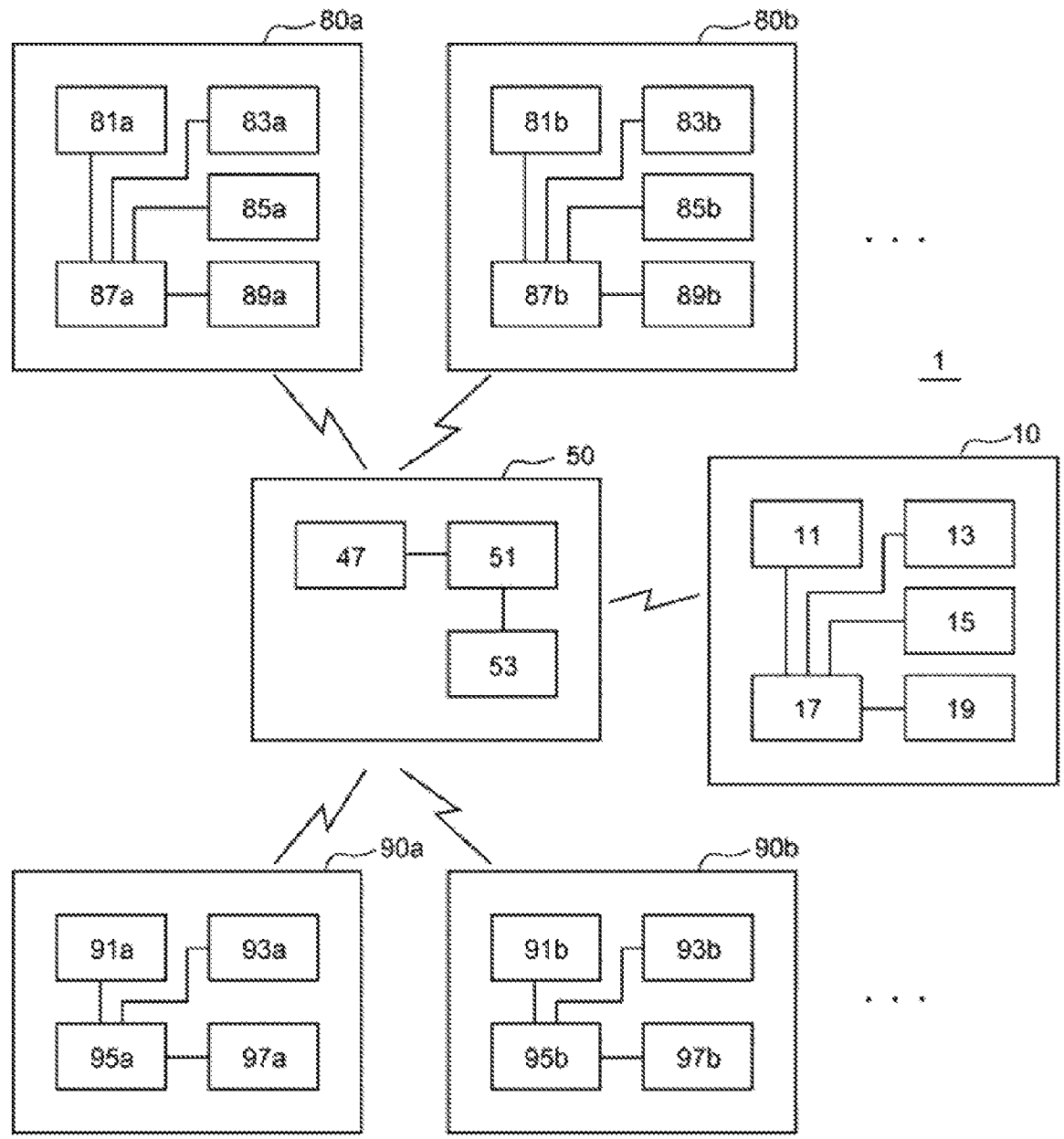
FIG. 1 is a schematic diagram illustrating a configuration example of a driver assistance system according to one embodiment of the disclosure.

The driver assistance apparatus described in JP-A No. 2008-293099 does not actually detect an object that rushes out of the blind spot region, and therefore, carries out a control such as deceleration even if nothing actually rushes out when the vehicle passes by the blind spot region. The vehicle control apparatus described in JP-A No. 2019-79206 makes the vehicle stop for the sake of safety until the oncoming vehicle passes by the vehicle, in the case where the state of the blind spot region is unrecognizable. Thus, for example, deceleration is repeated in spite of no rushes, causing lowered reliability or acceptability of the driver assistance apparatus. Depending on cases, this results in possibility that driver assistance is no longer utilized.

It is desirable to provide a driver assistance system and a computer-readable recording medium containing a computer program that make it possible to carry out assistance processing in accordance with certainty of object recognition with respect to a blind spot region.

In the following, some example embodiments of the disclosure are described in detail with reference to the accompanying drawings. Note that the following description is directed to illustrative examples of the disclosure and not to be construed as limiting to the disclosure. Factors including, without limitation, numerical values, shapes, materials, components, positions of the components, and how the components are coupled to each other are illustrative only and not to be construed as limiting to the disclosure. Further, elements in the following example embodiments which are not recited in a most-generic independent claim of the disclosure are optional and may be provided on an as-needed basis. The drawings are schematic and are not intended to be drawn to scale. Throughout the present specification and the drawings, elements having substantially the same function and configuration are denoted with the same reference numerals to avoid any redundant description. In addition, elements that are not directly related to any embodiment of the disclosure are unillustrated in the drawings.

<1. Basic Configuration of Driver Assistance System>

Description is given first of a basic configuration of a driver assistance system according to one embodiment of the disclosure.

FIG. 1 is a block diagram illustrating an example of a basic configuration of a driver assistance system 1. The driver assistance system 1 serves as a system that assists in driving a vehicle 10 to be assisted. The driver assistance system 1 may include a driver assistance apparatus 50. The driver assistance apparatus 50 is configured to carry out processing of reducing a risk of collision between the vehicle 10 and a passer-by present in a blind spot region on the occasion that the vehicle 10 passes by the blind spot region. The driver assistance apparatus 50 is configured to communicate with object recognition systems through wireless communication such as mobile communication, NFC (Near Field Communication), or Wi-Fi.

The object recognition systems may include, for example, one or more object recognition systems 80a, 80b, . . . and one or more object recognition systems 90a, 90b, . . . The one or more object recognition systems 80a, 80b, . . . are mounted on one or more random vehicles other than the vehicle 10 to be assisted. Hereinafter, the one or more object recognition systems 80a, 80b, . . . are collectively referred to as "random vehicle object recognition systems 80". The one or more object recognition systems 90a, 90b, . . . are installed, for example, on the roadside or on the infrastructure. Hereinafter, the one or more object recognition systems 90a, 90b, . . . are collectively referred to as "roadside object recognition systems 90". The random vehicles on which the random vehicle object recognition systems 80 are mounted are not limited to traveling random vehicles, but may include parked random vehicles. The roadside object recognition systems 90 may be exemplified by, for example, a roadside camera, but this is non-limiting.

The vehicle 10 to be assisted may include a communication unit 11, a GNSS (Global Navigation Satellite System) sensor 13, a surrounding environment sensor 15, a processor 17, and a storage 19. The communication unit 11 is an interface based on a predetermined communication standard to communicate with the driver assistance apparatus 50.

The GNSS sensor 13 receives satellite signals transmitted from satellites typified by GPS (Global Positioning System) satellites. The GNSS sensor 13 acquires positional data regarding the vehicle 10 on a world coordinate system included in the satellite signals received, and transmits the acquired positional data to the processor 17. It is to be noted that the GNSS sensor 13 may further include an antenna that receives satellite signals from other satellite systems that identify a position of the vehicle 10 than the GPS satellites.

The surrounding environment sensor 15 may include any one or more of cameras, and ranging sensors such as LiDAR (Light Detection And Ranging), a radar sensor such as millimeter wave radar, and an ultrasonic sensor. The cameras include imaging elements such as CCD (Charged-Coupled Devices) or CMOS (Complementary Metal-Oxide-Semiconductor). The one or more sensors of the surrounding environment sensor 15 detect surrounding environment around the vehicle 10 and output detected data to the processor 17.

The processor 17 carries out processing of recognizing an object and detecting the blind spot region as viewed from the vehicle 10, by allowing one or more processors such as a CPU (Central Processing Unit) to execute a computer program. The storage 19 is communicably coupled to the processor 17. The storage 19 holds, for example, the computer program to be executed by the one or more processors, various parameters to be involved in calculation processing, the detected data acquired from the surrounding environment sensor 15, and calculation results. The processor 17 may carry out the processing of reducing the risk of collision between the vehicle 10 and a passer-by on the basis of data regarding presence or absence of the passer-by in the blind spot region and data regarding certainty of a recognition result of the presence or the absence of the passer-by in the blind spot region acquired from the driver assistance apparatus 50.

The random vehicle object recognition systems 80 may each include a communication unit 81, a GNSS sensor 83, a surrounding environment sensor 85, a processor 87, and a storage 89. The communication unit 81 is an interface based on a predetermined communication standard to communicate with the driver assistance apparatus 50.

The GNSS sensor 83 receives satellite signals transmitted from satellites typified by the GPS satellites. The GNSS sensor 83 acquires positional data regarding a random vehicle on the world coordinate system included in the satellite signals received, and transmits the acquired positional data to the processor 87. It is to be noted that the GNSS sensor 83 may further include an antenna that receives satellite signals from other satellite systems that identify a position of the random vehicle than the GPS satellites.

The surrounding environment sensor 85 may include any one or more of cameras, and ranging sensors such as LiDAR, a radar sensor such as millimeter wave radar, and an ultrasonic sensor. The cameras include imaging elements such as CCD or CMOS. The one or more sensors of the surrounding environment sensor 85 detect surrounding environment around the random vehicle and output detected data to the processor 87.

The processor 87 carries out processing of recognizing an object, by allowing one or more processors such as a CPU to execute a computer program. The storage 89 is communicably coupled to the processor 87. The storage 89 holds, for example, the computer program to be executed by the one or more processors, various parameters to be involved in calculation processing, the detected data acquired from the surrounding environment sensor 85, and calculation results. The processor 87 carries out processing of transmitting data regarding an object recognition result, together with the positional data regarding the random vehicle transmitted from the GNSS sensor 83, to the driver assistance apparatus 50 through the communication unit 81.

The roadside object recognition systems 90 may each include a communication unit 91, a surrounding environment sensor 93, a processor 95, and a storage 97. The communication unit 91 is an interface based on a predetermined communication standard to communicate with the driver assistance apparatus 50. The communication unit 91 may communicate directly with the driver assistance apparatus 50, or alternatively, the communication unit 91 may communicate with the driver assistance apparatus 50 through, for example, a server that manages the roadside object recognition systems 90.

The surrounding environment sensor 93 may include, in one typical example, cameras including imaging elements such as CCD or CMOS. However, the surrounding environment sensor 93 may include one or more of ranging sensors such as LiDAR, a radar sensor such as millimeter wave radar, and an ultrasonic sensor. The surrounding environment sensor 93 detects surrounding environment in a predetermined range of recognition in accordance with a position of installation and a direction of recognition. The surrounding environment sensor 93 outputs detected data to the processor 95.

The processor 95 carries out processing of recognizing an object, by allowing one or more processors such as a CPU to execute a computer program. The storage 97 is communicably coupled to the processor 95. The storage 97 holds, for example, the computer program to be executed by the one or more processors, various parameters to be involved in calculation processing, the detected data acquired from the surrounding environment sensor 93, and calculation results. The processor 95 carries out processing of transmitting data regarding an object recognition result to the driver assistance apparatus 50 through the communication unit 91.

The driver assistance apparatus 50 may include a communication unit 47, a processor 51, and a storage 53. The communication unit 47 includes one or more interfaces based on a predetermined communication standard to communicate with the vehicle 10 to be assisted, the random vehicle object recognition systems 80, and the roadside object recognition systems 90. In a case where the driver assistance apparatus 50 is mounted on the vehicle 10 to be assisted, an interface to communicate with an on-vehicle network of the vehicle 10 to be assisted may be omitted from the communication unit 47.

The processor 51 acquires the data regarding the presence or the absence of the passer-by in the blind spot region as viewed from the vehicle 10 to be assisted, on the basis of the data regarding the object recognition results transmitted from the random vehicle object recognition systems 80 and the roadside object recognition systems 90, by allowing one or more processors such as a CPU to execute a computer program. Moreover, the processor 51 calculates the certainty of the recognition result of the presence or the absence of the passer-by in the blind spot region, and carries out processing of reducing the risk of collision between the passer-by and the vehicle 10 to be assisted, in accordance with the certainty calculated. The storage 53 is communicably coupled to the processor 51. The storage 53 holds, for example, the computer program to be executed by the one or more processors, various parameters to be involved in calculation processing, the detected data acquired from the surrounding environment sensor 15, and calculation results.

In the following, detailed description is given mainly of a configuration of the driver assistance apparatus 50. In the following embodiments, description is given of an example where the driver assistance apparatus 50 is mounted on an on-vehicle system of the vehicle 10.

<2. Overall Configuration of Vehicle to be Assisted>

Figure 2:
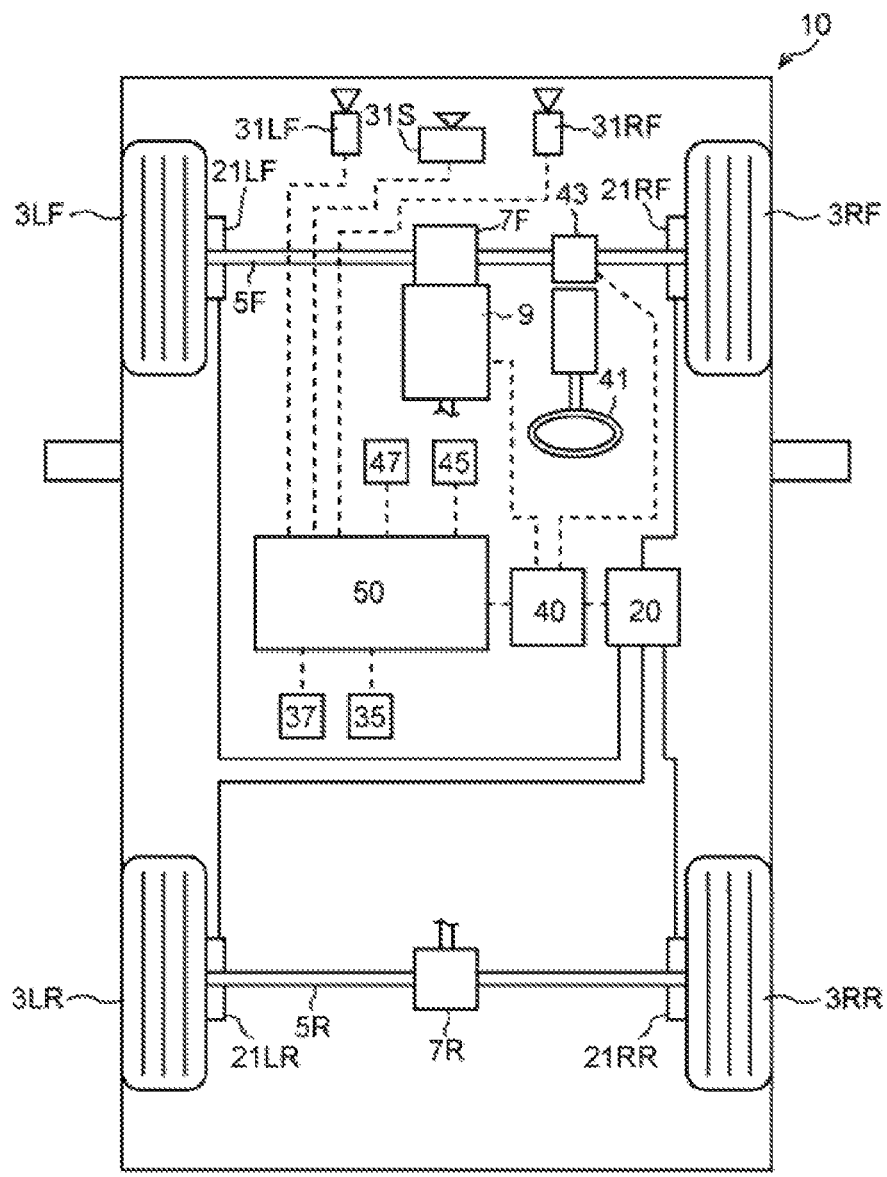
FIG. 2 is a schematic diagram illustrating a configuration example of a vehicle to which the driver assistance system according to the embodiment is applicable.

FIG. 2 is a schematic diagram illustrating a configuration example of the vehicle 10 including the driver assistance apparatus 50 according to this embodiment. The vehicle 10 illustrated in FIG. 2 is constituted as a four-wheel drive vehicle that transmits driving torque to a left front wheel 3LF, a right front wheel 3RF, a left rear wheel 3LR, and a right rear wheel 3RR (in the following, collectively referred to as "wheels 3" unless distinction is particularly necessary). The driving torque is outputted from a driving force source 9 that generates the driving torque for the vehicle. The driving force source 9 may be an internal combustion engine such as a gasoline engine or a diesel engine, or may be a driving motor. The driving force source 9 may include an internal combustion engine and a driving motor together.

It is to be noted that the vehicle 10 may be an electric vehicle including two driving motors, e.g., a front wheel driving motor and a rear wheel driving motor, or may be an electric vehicle including driving motors that correspond to the respective wheels 3. In a case where the vehicle 10 is an electric vehicle or a hybrid electric vehicle, a secondary battery, and a generator such as a motor and a fuel cell are mounted on the vehicle 10. The secondary battery accumulates electric power to be supplied to the driving motor. The generator generates electric power to be charged in the battery. Furthermore, the vehicle 10 may be a two-wheel-driven four-wheeled vehicle, or may be other kinds of vehicles such as a two-wheeled vehicle.

The vehicle 10 includes the driving force source 9, an electric steering device 43, and a brake hydraulic control unit 20, as devices to be used in a driving control of the vehicle 10. The driving force source 9 outputs the driving torque to be transmitted to a front wheel driving shaft 5F and a rear wheel driving shaft 5R through an unillustrated transmission, a front wheel differential mechanism 7F, and a rear wheel differential mechanism 7R. Driving of the driving force source 9 and the transmission is controlled by a vehicle control device 40 including one or more electronic control units (ECU: Electronic Control Unit).

The electric steering device 43 is provided on the front wheel driving shaft 5F. The electric steering device 43 includes an unillustrated electric motor and an unillustrated gear mechanism. The electric steering device 43 is controlled by the vehicle control device 40 to adjust steering angles of the left front wheel 3LF and the right front wheel 3RF. In manual driving, the vehicle control device 40 controls the electric steering device 43 on the basis of a steering angle of a steering wheel 41 by a driver who drives the vehicle 10. Moreover, in automated driving, the vehicle control device 40 controls the electric steering device 43 on the basis of a target steering angle to be set by the driver assistance apparatus 50 or an unillustrated automated driving control device.

A brake system of the vehicle 10 is constituted as a hydraulic brake system. The brake hydraulic control unit 20 adjusts hydraulic pressure to be supplied to each of brake calipers 21LF, 21RF, 21LR, and 21RR (hereinafter, collectively referred to as "brake calipers 21" unless distinction is particularly necessary) provided respectively on the front, rear, left, and right drive wheels 3LF, 3RF, 3LR, and 3RR, to generate a braking force. Driving of the brake hydraulic control unit 20 is controlled by the vehicle control device 40. In the case where the vehicle 10 is an electric vehicle or a hybrid electric vehicle, the brake hydraulic control unit 20 is used in conjunction with a regenerative brake by the driving motor.

The vehicle control device 40 includes one or more electronic control devices that control driving of the driving force source 9, the electric steering device 43, and the brake hydraulic control unit 20. The driving force source 9 outputs the driving torque for the vehicle 10. The electric steering device 43 controls the steering angle of the steering wheel 41 or a steering wheel. The brake hydraulic control unit 20 controls the braking force of the vehicle 10. The vehicle control device 40 may control the driving of the transmission that performs shifting of an output outputted from the driving force source 9 and transmits the resultant output to the wheels 3. The vehicle control device 40 is configured to acquire data transmitted from the driver assistance apparatus 50 or the unillustrated automated driving control device, and is configured to carry out an automated driving control of the vehicle 10. Moreover, in the manual driving of the vehicle 10, the vehicle control device 40 acquires data regarding an amount of an operation by the driving by the driver, and controls the driving of the driving force source 9, the electric steering device 43, and the brake hydraulic control unit 20. The driving force source 9 outputs the driving torque for the vehicle 10. The electric steering device 43 controls the steering angle of the steering wheel 41 or the steering wheel. The brake hydraulic control unit 20 controls the braking force of the vehicle 10.

Moreover, the vehicle 10 includes forward view capturing cameras 31LF and 31RF, a ranging sensor 31S, a vehicle state sensor 35, and a GNSS sensor 37. The forward view capturing cameras 31LF and 31RF, and the ranging sensor 31S constitute a surrounding environment sensor 31 to acquire data regarding surrounding environment around the vehicle 10. The forward view capturing cameras 31LF and 31RF capture a forward view of the vehicle 10 and generate image data. The forward view capturing cameras 31LF and 31RF include imaging elements such as CCD or CMOS, and transmit the generated image data to the driver assistance apparatus 50. The ranging sensor 31S include one or more of LiDAR, a radar sensor such as millimeter wave radar, and an ultrasonic sensor. The ranging sensor 31S transmits detection data including a position and a speed of a detected point group, to the driver assistance apparatus 50.

In the vehicle 10 illustrated in FIG. 2, the forward view capturing cameras 31LF and 31RF constitute a stereo camera including a pair of left and right cameras. However, the forward view capturing cameras 31LF and 31RF may each be a monocular camera. In addition to the forward view capturing cameras 31LF and 31RF, the vehicle 10 may include, for example, a rearward view capturing camera, or a left or right rearward view capturing camera. The rearward view capturing camera is provided in a rear part of the vehicle 10 and captures a rearward view. The left or right rearward view capturing camera is provided on a side mirror.

In this specification, a system that recognizes an object around the vehicle 10 with the use of the surrounding environment sensor 31 mounted on the vehicle 10 is called a "vehicle object recognition system".

The vehicle state sensor 35 includes one or more sensors that detect an operation state and behavior of the vehicle 10. The vehicle state sensor 35 includes, for example, one or more of a steering angle sensor, an accelerator position sensor, a brake stroke sensor, a brake pressure sensor, and an engine speed sensor. These sensors each detect the operation state of the vehicle 10 such as the steering angle of the steering wheel 41 or the steering wheel, an accelerator position, an amount of a brake operation, or an engine speed. Moreover, the vehicle state sensor 35 includes, for example, one or more of a vehicle speed sensor, an acceleration rate sensor, and an angular speed sensor. These sensors each detect the behavior of the vehicle such as a vehicle speed, a longitudinal acceleration rate, a lateral acceleration rate, and a yaw rate. The vehicle state sensor 35 transmits a sensor signal including the detected data, to the driver assistance apparatus 50.

The GNSS sensor 37 receives satellite signals transmitted from satellites typified by the GPS satellites. The GNSS sensor 37 transmits, to the driver assistance apparatus 50, positional data regarding the vehicle 10 on the world coordinate system included in the satellite signals received. It is to be noted that the GNSS sensor 37 may further include an antenna that receives satellite signals from other satellite systems that identify the position of the vehicle 10 than the GPS satellites.

The vehicle 10 may further include a notification device 45 and the communication unit 47. The notification device 45 provides the driver with various kinds of information by, for example, image display or sound output, on the basis of the data transmitted from the driver assistance apparatus 50. The notification device 45 includes, for example, a display unit and a speaker. The display unit is provided in an instrument panel. The speaker is provided in the vehicle. The display unit may be a display unit of a navigation system. Moreover, the notification device 45 may include an HUD (Head Up Display) that provides display on a windshield in superimposition over scenes around the vehicle 10. The communication unit 47 includes one or more interfaces that establish communication with an external device by, for example, vehicle-to-vehicle communication, road-to-vehicle communication, and mobile communication.

<3. Driver Assistance Apparatus>

Next, the driver assistance apparatus 50 according to this embodiment is described in detail.

(3-1. Overall Configuration)

Figure 3:
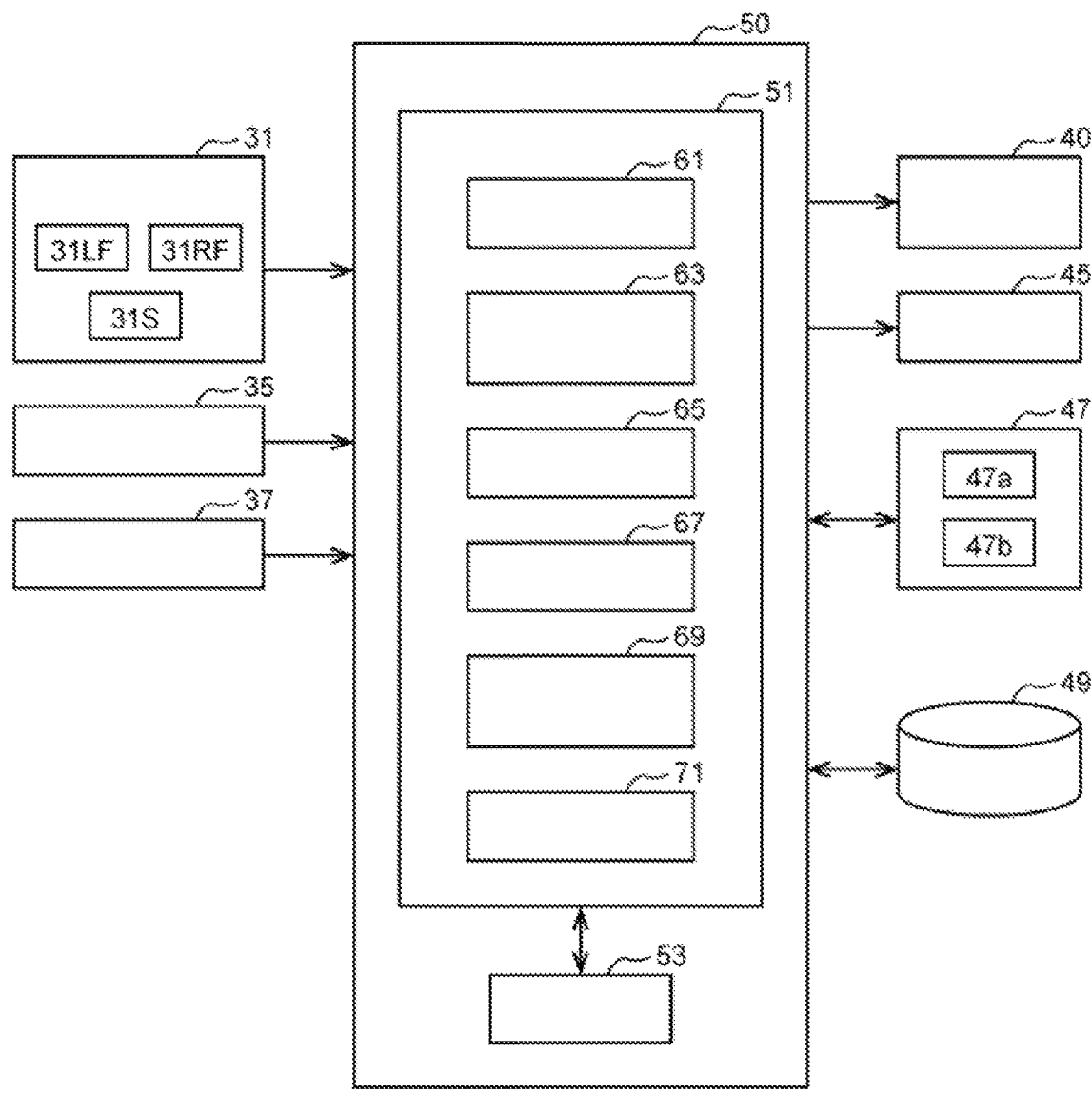
FIG. 3 is a block diagram illustrating a configuration example of a driver assistance apparatus of the driver assistance system according to the embodiment.

FIG. 3 is a block diagram illustrating a configuration example of the driver assistance apparatus 50 according to this embodiment.

To the driver assistance apparatus 50, the surrounding environment sensor 31, the vehicle state sensor 35, and the GNSS sensor 37 are coupled through a dedicated line, or CAN (Controller Area Network) or LIN (Local Inter Net). Moreover, to the driver assistance apparatus 50, the vehicle control device 40 and the notification device 45 are coupled through a dedicated line, or CAN or LIN.

To the driver assistance apparatus 50, the communication unit 47 is coupled. The communication unit 47 includes a first communication subunit 47a and a second communication subunit 47b. Each of the first communication subunit 47a and the second communication subunit 47b includes an external communication interface that allows the processor 51 to communicate with external devices. The first communication subunit 47a includes, for example, an interface for the road-to-vehicle communication, and is used for transmission and reception to and from the roadside object recognition systems installed, for example, on the roadside or on the infrastructure. The second communication subunit 47b includes an interface for the vehicle-to-vehicle communication, and is used for communication with random vehicles around the vehicle 10. Data to be acquired from the random vehicles through the second communication subunit 47b includes the data regarding the recognition results by the random vehicle object recognition systems mounted on the random vehicles.

Object recognition systems other than the vehicle object recognition system are collectively referred to as external object recognition systems. Non-limiting examples of the external object recognition systems include the roadside object recognition systems and the random vehicle object recognition systems. An object recognition system means a system that detects an object in a predetermined region of recognition with the use of one or more sensors. One object recognition system may include one or more surrounding environment sensors.

To the driver assistance apparatus 50, a map database 49 is coupled. The map database 49 holds high-precision three-dimensional (3D) map data. Hereinafter, the high-precision three-dimensional map data is also simply referred to as "map data". The high-precision three-dimensional map data is three-dimensional map data including various kinds of data such as geographical features, roads, lanes, buildings, traffic lights, and roadside installed cameras, without limitation. The map database 49 may be mounted on the vehicle 10, or alternatively, the map database 49 may be held in, for example, an external server configured to be coupled through the communication unit 47.

The driver assistance apparatus 50 serves as an apparatus that assists in driving the vehicle 10 by allowing one or more processors such as a CPU to execute a computer program. The computer program is a computer program that causes the one or more processors to perform operation described later to be performed by the driver assistance apparatus 50. The computer program to be executed by the one or more processors may be contained in a recording medium that serves as the storage 53 (memory) provided in the driver assistance apparatus 50. Alternatively, the computer program to be executed by the one or more processors may be contained in a recording medium built in the driver assistance apparatus 50, or any recording medium externally attachable to the driver assistance apparatus 50.

The recording medium containing the computer program may be: a magnetic medium such as a hard disk, a floppy disk, and a magnetic tape; an optical recording medium such as a CD-ROM (Compact Disk Read Only Memory), a DVD (Digital Versatile Disk), and a Blu-ray (registered trademark); a magnetic-optical medium such as a floptical disk; a storage element such as a RAM (Random Access Memory) and a ROM (Read Only Memory); a flash memory such as a USB (Universal Serial Bus) memory and an SSD (Solid State Drive); or any other medium that is able to hold programs.

The driver assistance apparatus 50 includes the processor 51 and the storage 53. The processor 51 includes one or more processors. A portion or all of the processor 51 may include an updatable one such as firmware, or may be, for example, a program module to be executed in accordance with a command from, for example, a CPU. The storage 53 includes a memory such as a RAM or a ROM. The storage 53 is communicably coupled to the processor 51. However, there is no particular limitation on the number of the storages 53 and the kind of the storage 53. The storage 53 holds a computer program to be executed by the processor 51, and data to be used in calculation processing, e.g., various parameters, detection data, and calculation results.

It is to be noted that the driver assistance apparatus 50 is not limited to an electronic control device mounted on the vehicle 10, but may be a terminal device such as a smartphone or a wearable device.

(3-2. Configuration of Processor)

The processor 51 of the driver assistance apparatus 50 includes a traveling state detection unit 61, a surrounding environment data acquisition unit 63, a blind spot region detection unit 65, an object recognition data acquisition unit 67, a blind spot certainty calculation unit 69, and a countermeasure unit 71. These units are realized by execution of the computer program by the one or more processors. However, a portion of each unit may include an analog circuit. In the following, after brief description of each unit, processing operation of the driver assistance apparatus 50 is described in detail.

(Traveling State Detection Unit)

The traveling state detection unit 61 acquires data regarding the operation state and the behavior of the vehicle 10 on the basis of the detection data transmitted from the vehicle state sensor 35. The traveling state detection unit 61 acquires the data regarding the operation state of the vehicle 10 such as the steering angle of the steering wheel or the steering wheel, the accelerator position, the amount of the brake operation, or the engine speed, and the data regarding the behavior of the vehicle 10 such as the vehicle speed, the longitudinal acceleration rate, the lateral acceleration rate, and the yaw rate.

(Surrounding Environment Data Acquisition Unit)

The surrounding environment data acquisition unit 63 acquires surrounding environment data regarding the vehicle 10 on the basis of the detection data transmitted from the surrounding environment sensor 31 of the vehicle object recognition system. In one example, the surrounding environment data acquisition unit 63 acquires data regarding a kind, a size (width, height, and depth), and a position of an object present ahead of the vehicle 10, a distance from the vehicle 10 to the object, and a relative speed between the vehicle 10 and the object. Alternatively, the surrounding environment data acquisition unit 63 may identify the position of the vehicle 10 on the map data on the basis of the positional data regarding the vehicle 10 transmitted from the GNSS sensor 37, and acquire the surrounding environment data regarding the vehicle 10 on the basis of the high-precision three-dimensional map data. The object to be detected includes a random vehicle traveling, a parked vehicle, pedestrians, bicycles, sidewalks, curb stones, buildings, utility poles, traffic signs, traffic lights, natural objects, and any other moving bodies and stationary objects present around the vehicle 10. Moreover, in addition to three-dimensional objects, the surrounding environment data acquisition unit 63 acquires data regarding non-three-dimensional objects such as lane lines, lanes, and intersections.

(Blind Spot Region Detection Unit)

The blind spot region detection unit 65 detects the blind spot region as viewed from the vehicle 10 on the basis of the surrounding environment data detected by the surrounding environment data acquisition unit 63. In one example, let us assume a case where a three-dimensional object that possibly forms the blind spot region as viewed from the vehicle 10 is present ahead in a direction of travel of the vehicle 10. Hereinafter, the three-dimensional object that possibly forms the blind spot region as viewed from the vehicle 10 is also referred to as a blind spot forming object. In this case, the blind spot region detection unit 65 detects a region behind the blind spot forming object, as the blind spot region. For example, in a case where a parked vehicle is detected ahead of the vehicle 10, the blind spot region detection unit 65 detects a region behind the parked vehicle, as the blind spot region undetectable by the surrounding environment sensor 31. In a case where a building such as a sidewall is detected in front of a corner ahead of the vehicle 10 on the basis of the map data and the positional data regarding the vehicle 10 on the map data, the blind spot region detection unit 65 detects a region beyond the corner, as the blind spot region.

The blind spot region detection unit 65 calculates a relative position and a range of extension of the blind spot region as viewed from the vehicle 10, on the basis of, for example, a distance from the vehicle 10 to the blind spot forming object, and a relative position. For example, the blind spot region detection unit 65 assumes a specific position of the vehicle 10 as an origin, and calculates the range of extension of the blind spot region in a coordinate system having an orthogonal three axes including a longitudinal direction of a vehicle body, a vehicle widthwise direction, and a vehicle heightwise direction. At this occasion, the blind spot region detection unit 65 detects the blind spot region within a preset distance from the vehicle 10. The preset distance may be a constant value, or alternatively, the preset distance may be a variable value with the speed of the vehicle 10. However, there is no limitation on the method of detecting the blind spot region.

(Object Recognition Data Acquisition Unit)

The object recognition data acquisition unit 67 acquires the data regarding the object recognition results by the external object recognition systems, through the first communication subunit 47a and the second communication subunit 47b. The data to be acquired regarding the object recognition results may include data regarding kinds and speeds of objects detected by each of the object recognition systems, and positions of the detected objects in a coordinate system of each of the object recognition systems. The data to be acquired regarding the object recognition results may further include data regarding the kind of the surrounding environment sensor provided in each of the object recognition systems. The kind of the surrounding environmental sensor represents classification such as a camera, LiDAR, a radar sensor such as millimeter-wave radar, or an ultrasonic sensor.

Moreover, the data to be acquired regarding the object recognition results may include data that allows for identification of a range of recognition of each of the object recognition systems. The range of recognition of the object recognition system may be identified by, for example, a position of an origin of the coordinate system in a space of recognition of the object recognition system and a direction of recognition. The position of the origin may be a position on the map data. For example, in the case of the roadside object recognition system, the position of the origin of the coordinate system in the space of recognition may be data regarding a position of installation and the direction of recognition of the surrounding environment sensor that can be associated with a position on the high-precision three-dimensional map data. In the case of the random vehicle object recognition system, the position of the origin of the coordinate system in the space of recognition and the direction of recognition may be obtained on the basis of relation between a position and a direction of a random vehicle, and the position of the surrounding environment sensor on the relevant random vehicle. In this case, the position of the random vehicle may be a position on the map data, or alternatively, the position of the random vehicle may be a relative position of the random vehicle with respect to the vehicle 10.

(Blind Spot Certainty Calculation Unit)

The blind spot certainty calculation unit 69 calculates passer-by recognition certainty Ah on the basis of the object recognition results by the external object recognition systems acquired by the object recognition data acquisition unit 67. The passer-by recognition certainty Ah is certainty of a recognition result of presence or absence of a passer-by in the blind spot region. In this embodiment, in addition to the passer-by recognition certainty Ah, the blind spot certainty calculation unit 69 calculates blind spot certainty Ad of the entire blind spot region, on the basis of a ratio of the recognition region where object recognition processing performed by each of the external object recognition systems to the blind spot region as viewed from the vehicle 10. Thus, in a case with a passer-by recognized within the blind spot region, the blind spot certainty calculation unit 69 calculates the passer-by recognition certainty Ah of the recognition result of the passer-by on the basis of the blind spot certainty Ad and the number of the object recognition systems recognizing the relevant passer-by.

In one example, the blind spot certainty calculation unit 69 obtains an overlap region where the range of recognition of each of the object recognition systems overlaps with the blind spot region as viewed from the vehicle 10, on the basis of the data regarding the recognition result by each of the external object recognition systems. Moreover, the blind spot certainty calculation unit 69 separates off the blind spot region into subregions by the number of the object recognition systems recognizing each of the subregions, and calculates the blind spot certainty Ad of the entire blind spot region in accordance with an area ratio of each of the subregions. For example, in a case with the three external object recognition systems having the ranges of recognition overlapping with the blind spot region, the blind spot certainty Ad of the entire blind spot region is given by the following expression.

$$Ad = E3 \times R3 + E2 \times R2 + E1 \times R1 \tag{1}$$

E1: Blind spot certainty of the subregion that overlaps with the range of recognition of the one object recognition system E2: Blind spot certainty of the subregion that overlaps with the ranges of recognition of the two object recognition systems E3: Blind spot certainty of the subregion that overlaps with the ranges of recognition of the three object recognition systems R1: Area ratio of the subregion that overlaps with the range of recognition of the one object recognition system, to the blind spot region R2: Area ratio of the subregion that overlaps with the ranges of recognition of the two object recognition systems, to the blind spot region R3: Area ratio of the subregion that overlaps with the ranges of recognition of the three object recognition systems, to the blind spot region FIG. 4 illustrates an example in which the blind spot certainty corresponding to the number of the object recognition systems having the ranges of recognition overlapping with the blind spot region is expressed by a numerical value of 0 to 100 both inclusive. In this example, in a case where the number of the object recognition systems having the ranges of recognition overlapping with the blind spot region is zero (0), the blind spot certainty E0 of the relevant subregion is assumed to be "0". In a case where the number of the object recognition systems having the ranges of recognition overlapping with the blind spot region is 1, the blind spot certainty E1 of the relevant subregion is assumed to be "50". In a case where the number of the object recognition systems having the ranges of recognition overlapping with the blind spot region is 2, the blind spot certainty E2 of the relevant subregion is assumed to be "70". In a case where the number of the object recognition systems having the ranges of recognition overlapping with the blind spot region is 3, the blind spot certainty E3 of the relevant subregion is assumed to be "80". In a case where the number of the object recognition systems having the ranges of recognition overlapping with the blind spot region is 4 or more, the blind spot certainty E4 of the relevant subregion is assumed to be "100". However, the blind spot certainty of each of the subregions is merely an example, and is not limited to this example.

The blind spot certainty calculation unit 69 extracts data regarding a recognition result of a region corresponding to the blind spot region as viewed from the vehicle 10, from the data regarding the recognition result by each of the external object recognition systems, and determines whether or not any passers-by have been detected in the blind spot region. In a case where a passer-by has been detected in the blind spot region by one or more of the external object recognition systems, the blind spot certainty calculation unit 69 links the same passer-by to each other and performs numbering of each passer-by. The linking of the same passer-by is performed, for example, by linking passers-by detected by the respective object recognition systems who are located on the map data within a predetermined distance error. Alternatively, the linking of the same passer-by may be performed by linking passers-by detected by the respective object recognition systems who are located at relative positions to the vehicle 10 within a predetermined distance error. However, the method of linking the same passer-by is not limited to the example mentioned above.

The blind spot certainty calculation unit 69 obtains the number of the object recognition systems that recognize each passer-by. The blind spot certainty calculation unit 69 calculates the passer-by recognition certainty Ah on the basis of, at least, the number of the object recognition systems that recognize the same passer-by.

FIG. 5 illustrates an example of the passer-by recognition certainty Ah set in accordance with the number of the object recognition systems that recognize each passer-by. In the example illustrated in FIG. 5, in a case where the number of the object recognition systems that recognize the passer-by is 1, the passer-by recognition certainty Ah is set to "50". In a case where the number of the object recognition systems that recognize the passer-by is 2, the passer-by recognition certainty Ah is set to "60". In a case where the number of the object recognition systems that recognize the passer-by is 3, the passer-by recognition certainty Ah is set to "70". In a case where the number of the object recognition systems that recognize the passer-by is 4 or more, the passer-by recognition certainty Ah is set to "80".

Moreover, in addition to the number of the object recognition systems that recognize the same passer-by, the blind spot certainty calculation unit 69 may correct the passer-by recognition certainty Ah on the basis of the kind of the surrounding environment sensor of the object recognition system that recognizes the passer-by. It is known that, for example, cameras, LiDAR, radar sensors, and ultrasonic sensors differ in detection accuracy or reliability depending on the kinds of them. In addition, it is known that the surrounding environment sensors differ in detection accuracy or reliability depending on a distance from the sensor. For this reason, the passer-by recognition certainty Ah may be corrected in accordance with the kind of the surrounding environment sensor that recognizes the passer-by or the distance from the surrounding environment sensor to the recognized passer-by.

FIG. 6 summarizes examples of correction values set in accordance with the kinds of the surrounding environment sensors and the distances from the surrounding environment sensors to each passer-by. In a case where the surrounding environment sensor is a camera, the correction value for the subregion at a distance from the camera smaller than a focal length is set to "0". The correction value for the subregion at the distance from the camera larger than the focal length and smaller than a predetermined distance is set to "20". The correction value for the subregion at the distance from the camera larger than the predetermined distance and smaller than a recognizable distance is set to "10". In a case where the surrounding environment sensor is LiDAR, the correction value may be set in accordance with a setting state of illumination density. In the example illustrated in FIG. 6, the correction value for the subregion at a distance from the LiDAR smaller than a focal length is set to "10". The correction value for the subregion at the distance from the LiDAR larger than the focal length and smaller than a predetermined distance is set to "10". The correction value for the subregion at the distance from the LiDAR larger than the predetermined distance and smaller than a recognizable distance is set to "0".

In a case where each of the object recognition systems includes one specific surrounding environment sensor, the correction values set in accordance with, for example, the kind of the surrounding environment sensor are used. In a case where each of the object recognition systems includes multiple surrounding environment sensors, an average value of the correction values set in accordance with, for example, the kinds of the respective surrounding environment sensors may be set as the correction value, or alternatively, whichever of the correction values is larger may be set as the correction value.

(Countermeasure Unit)

The countermeasure unit 71 carries out the processing of reducing the risk of collision between the vehicle 10 and the passer-by in accordance with the data regarding the presence or the absence of the passers-by in the blind spot region acquired by the object recognition data acquisition unit 67 and the passer-by recognition certainty Ah calculated by the blind spot certainty calculation unit 69. As the processing of reducing the risk of collision between the vehicle 10 and the passer-by, the countermeasure unit 71 carries out one or both of processing of giving a notification to the passer-by who may be possibly present in the blind spot region and processing of correcting a traveling condition of the vehicle 10.

<1-3. Operation of Driver Assistance Apparatus>

Next, an operation example of the driver assistance apparatus 50 according to this embodiment is described in detail.

Figure 7:
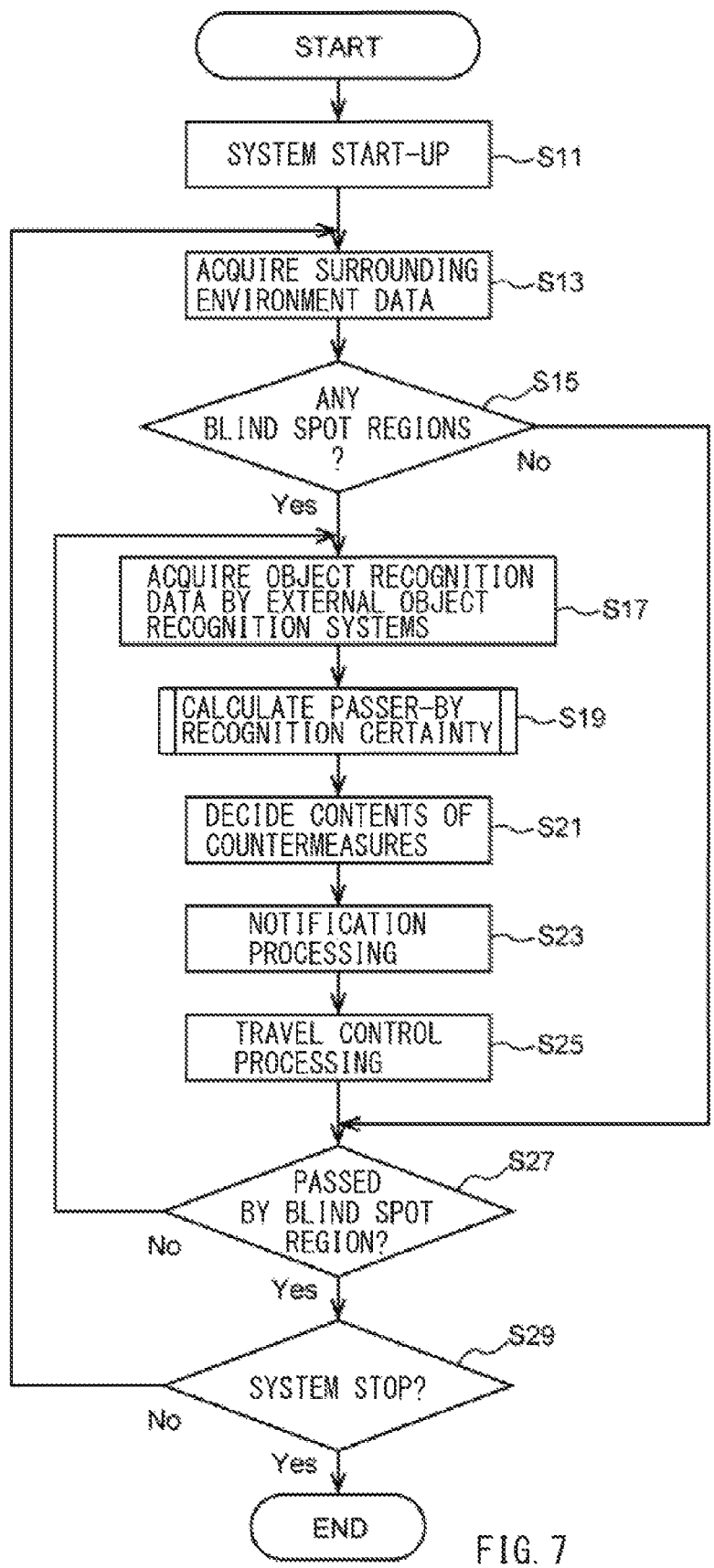
FIG. 7 is a flowchart illustrating processing operation of the driver assistance system according to the embodiment.
Figure 8:
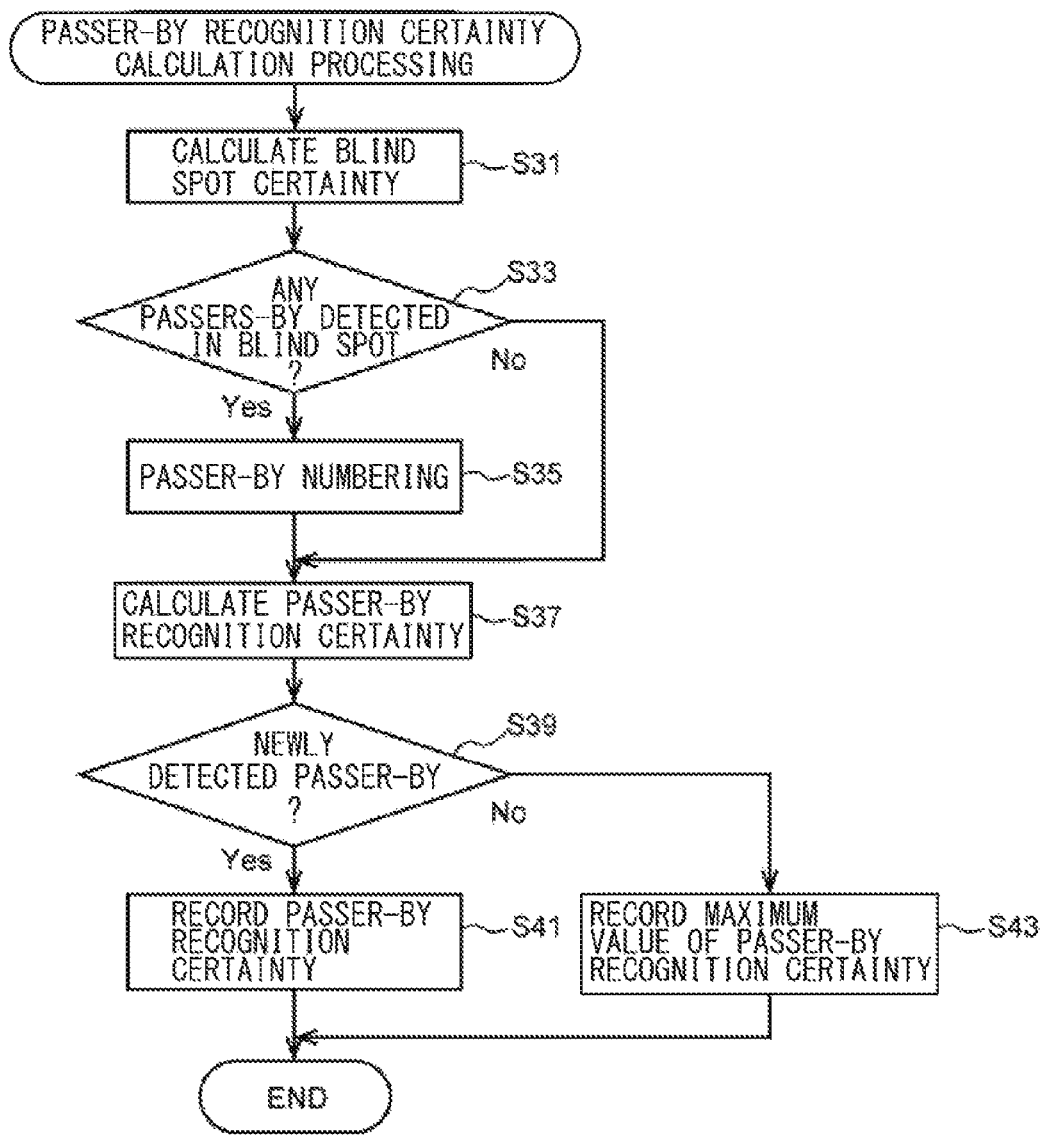
FIG. 8 is a flowchart illustrating processing of calculating the passer-by recognition certainty by the driver assistance system according to the embodiment.
Figure 9:
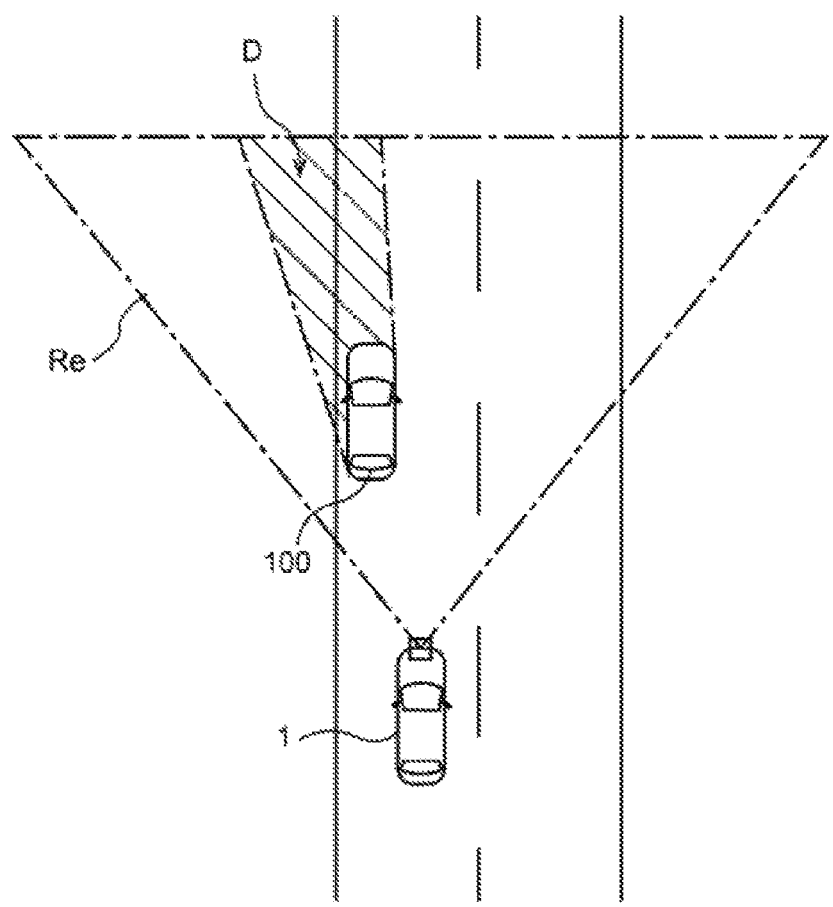
FIG. 9 is a diagram illustrating an example of the blind spot region to be detected.
Figure 10:
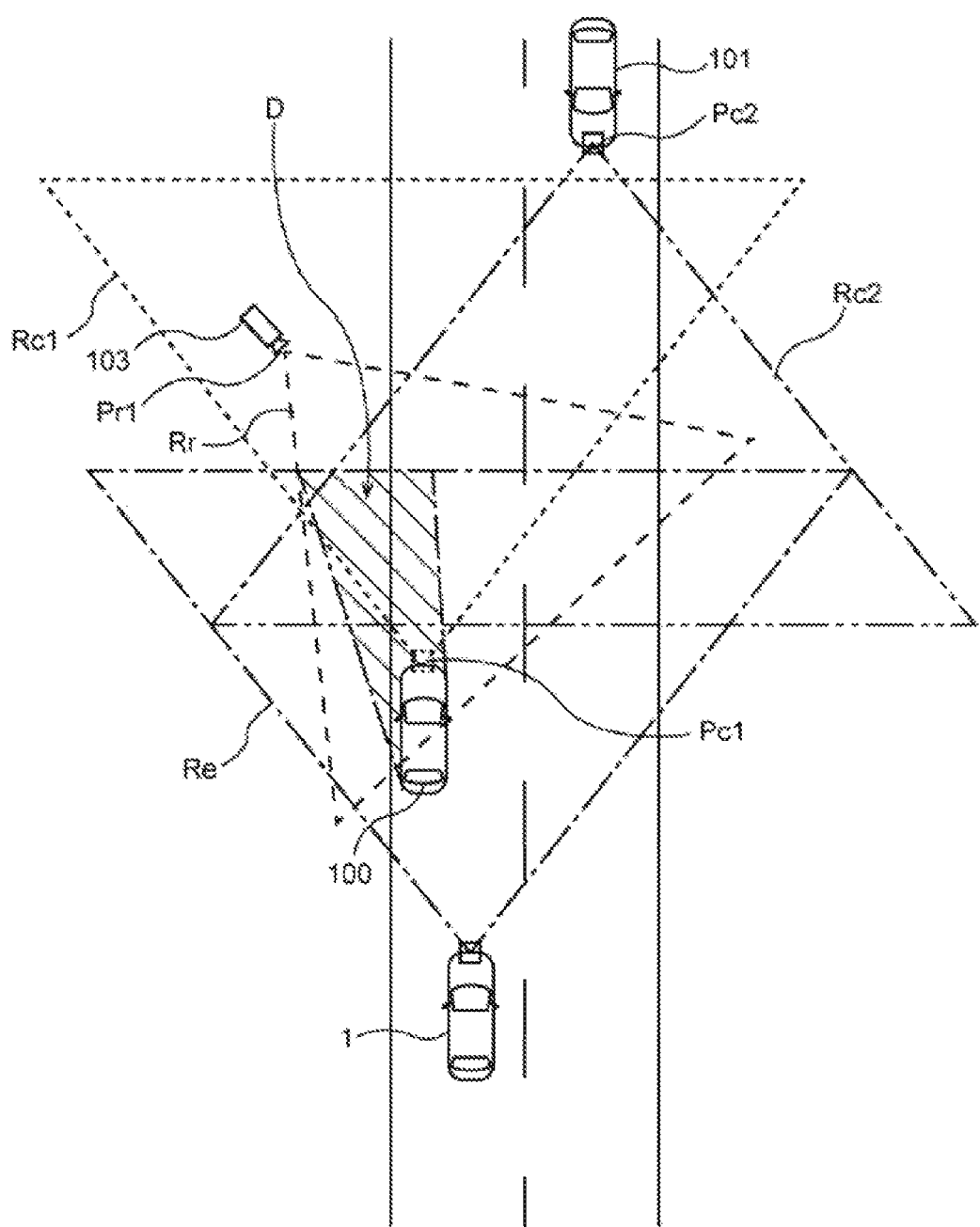
FIG. 10 is a diagram illustrating an example of an external object recognition system configured to communicate with the driver assistance apparatus.
Figure 11:
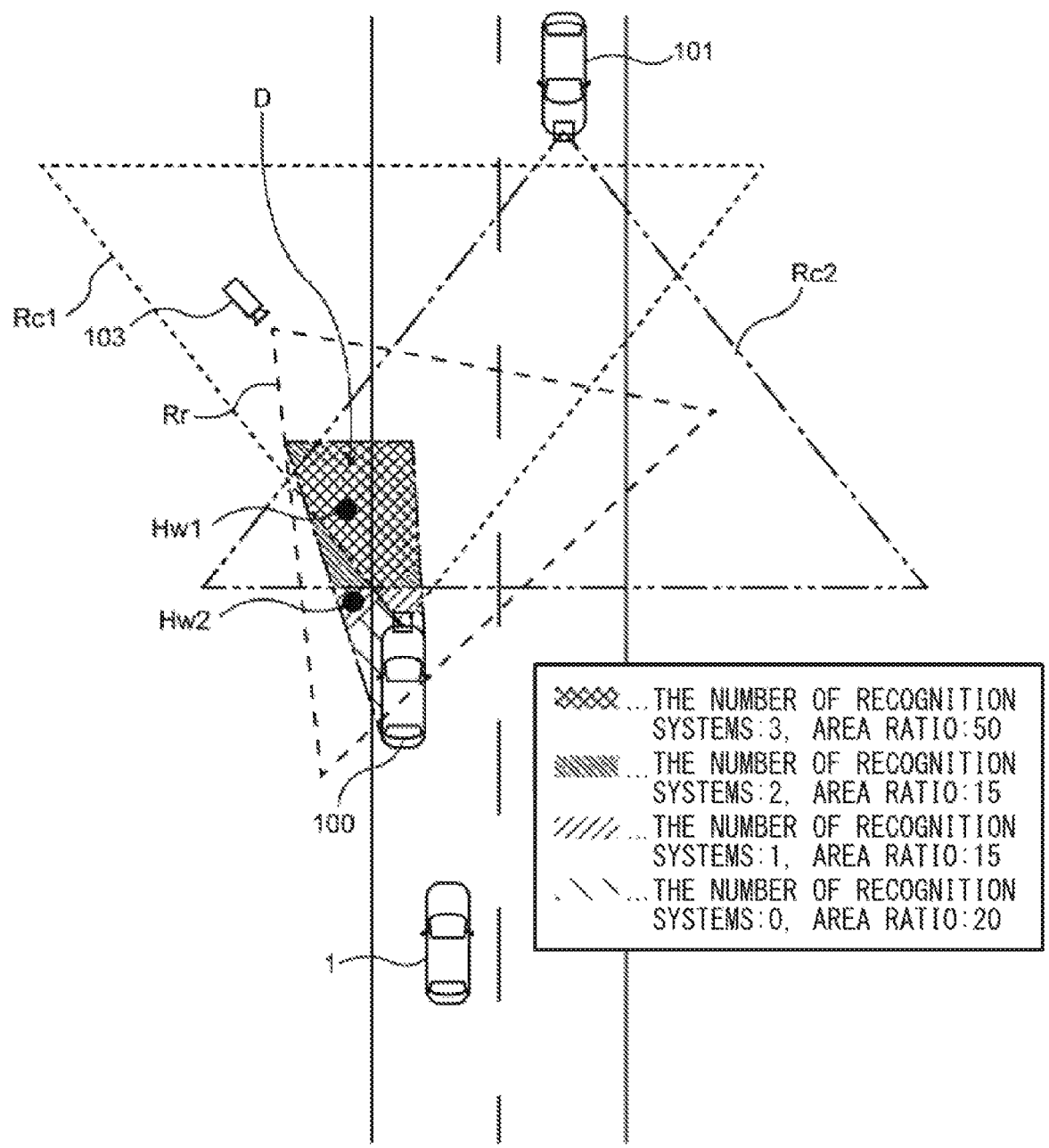
FIG. 11 is a diagram illustrating the ranges of recognition of the respective external object recognition systems.

FIGS. 7 and 8 are flowcharts illustrating an example of processing operation of the processor 51 of the driver assistance apparatus 50. FIGS. 9 to 11 are provided for description of the operation example of the driver assistance apparatus 50. In the following description, an example case is given where a parked vehicle 100 is present on the left end of a traveling lane ahead of the vehicle 10.

Upon a start-up of an on-vehicle system including the driver assistance apparatus 50 (step S11), the surrounding environment data acquisition unit 63 of the processor 51 acquires the surrounding environment data regarding the vehicle 10 (step S13). In one example, the surrounding environment data acquisition unit 63 acquires the surrounding environment data regarding the vehicle 10 from the surrounding environment sensor 31 of the vehicle object recognition system. For example, the surrounding environment data acquisition unit 63 may acquire data regarding an object present ahead in the direction of travel of the vehicle 10 on the basis of the detection data transmitted from the surrounding environment sensor 31. Moreover, the surrounding environment data acquisition unit 63 may acquire the data regarding the position, the size, and the speed of the object detected, the distance from the vehicle 10 to the object, and the relative speed between the vehicle 10 and the object.

For example, the surrounding environment data acquisition unit 63 detects the object ahead of the vehicle 10 with the use of, for example, a pattern matching technique, by performing image processing on the image data transmitted from the forward view capturing cameras 31LF and 31RF. Moreover, the surrounding environment data acquisition unit 63 calculates the position, the size, and the kind of the object as viewed from the vehicle 10, and the distance to the object, on the basis of the position of the object in the image data, a size of an occupied area by the object in the image data, and data regarding parallax of the left and right forward view capturing cameras 31LF and 31RF. Furthermore, the surrounding environment data acquisition unit 63 calculates the relative speed between the vehicle 10 and the object by time differentiating a change in the distance, and calculates a speed of the object on the basis of the data regarding the relative speed and data regarding the vehicle speed of the vehicle 10. In addition, the surrounding environment data acquisition unit 63 calculates the position, the size, the kind, and the speed of the object as viewed from the vehicle 10, and the distance to the object, on the basis of the data regarding the point group transmitted from the ranging sensor 31S such as LiDAR.

The surrounding environment data acquisition unit 63 may acquire the positional data regarding the vehicle 10 transmitted from the GNSS sensor 37 and identify the position of the vehicle 10 on the map data, to acquire the surrounding environment data regarding the vehicle 10 on the basis of the high-precision three-dimensional map data.

For example, the surrounding environment data acquisition unit 63 acquires data regarding a position, a shape, and a size (height) of a structure at an edge of the road on which the vehicle 10 is traveling.

Thereafter, the blind spot region detection unit 65 of the processor 51 determines presence or absence of any blind spot regions as viewed from the vehicle 10, ahead of the vehicle 10 (step S15). For example, in a case with the presence of a parked vehicle ahead of the vehicle 10 or in a case where, for example, a building is present in front of a corner ahead of the vehicle 10, the blind spot region detection unit 65 identifies a region behind the parked vehicle or, for example, the building, as the blind spot region, on the basis of the surrounding environment data detected in step S13. At this occasion, the blind spot region detection unit 65 calculates the relative position and the range of extension of the blind spot region as viewed from the vehicle 10, on the basis of, for example, the distance from the vehicle 10 to the blind spot forming object, e.g., the parked vehicle or the building, and the relative position. For example, the blind spot region detection unit 65 assumes the specific position of the vehicle 10 to be the origin, and calculates the range of extension of the blind spot region in the coordinate system having the three orthogonal axes including the longitudinal direction of the vehicle body, the vehicle widthwise direction, and the vehicle heightwise direction. The blind spot region detection unit 65 may set the blind spot region within the preset distance from the vehicle 10. The distance may be a constant value, or alternatively, the distance may be a variable value with the speed of the vehicle 10.

For example, as illustrated in FIG. 9, in a case where the parked vehicle 100 is detected within the range of recognition of the vehicle object recognition system, the blind spot region detection unit 65 sets a region behind the parked vehicle 100 as viewed from the vehicle 10, as a blind spot region D. In the example illustrated in FIG. 9, the blind spot region D is set, by the vehicle object recognition system, within a region set as a recognizable range Re. However, there is no particular limitation on the setting method of the blind spot region.

In a case without a determination as to the presence of the blind spot region (S15/No), unless a determination is made in step S29 that the on-vehicle system has stopped, the processor 51 causes the flow to return to step S13 and repeat the processing until the blind spot region is detected. In a case with the determination as to the presence of the blind spot region (S15/Yes), the object recognition data acquisition unit 67 acquires the data regarding the object recognition results by the external object recognition systems through the first communication subunit 47a and the second communication subunit 47b (step S17). In this embodiment, the object recognition data acquisition unit 67 acquires the data regarding the object recognition results from the roadside object recognition systems through the first communication subunit 47a. The roadside object recognition systems are installed on the roadside or on the infrastructure, and present within a range of a preset communication distance. The object recognition data acquisition unit 67 acquires, from random vehicles present within the range of the preset communication distance, the data regarding the object recognition results by the random vehicle object recognition systems mounted on the random vehicles, through the second communication subunit 47b.

The data to be acquired regarding the object recognition results may include data regarding the kind and the speed of the object detected by each of the object recognition systems, and the position of the detected object in the coordinate system in the space of recognition of each of the object recognition systems. Moreover, the data to be acquired regarding the object recognition results may include the data regarding the kind of the surrounding environment sensor provided in each of the object recognition systems. Furthermore, the data to be acquired regarding the object recognition results may include data that allows for identification of the position of the origin of the coordinate system in the space of recognition of each of the object recognition systems and the directions of the three axes of the coordinate system. The position of the origin may be the position on the map data.

In the example illustrated in FIG. 10, the object recognition data acquisition unit 67 acquires the data regarding the object recognition result from a roadside camera 103. The roadside camera 103 is configured to establish communication, i.e., the road-to-vehicle communication, through the first communication subunit 47a. Moreover, the object recognition data acquisition unit 67 acquires the data regarding the object recognition results from the parked vehicle 100 and an oncoming vehicle 101. The parked vehicle 100 and the oncoming vehicle 101 are configured to establish communication, i.e., the vehicle-to-vehicle communication, through the second communication subunit 47b.

The data to be acquired from the roadside camera 103 regarding the object recognition result may include data regarding the kind of the detected object and a coordinate position of the object in the space of recognition of the roadside camera 103. Moreover, the data to be acquired from the roadside camera 103 regarding the object recognition result may include data indicating that the surrounding environment sensor is a camera, and data regarding a position of installation Pr, a direction of imaging, and a range of recognition Rr of the roadside camera 103. The data regarding the position of installation Pr, the direction of imaging, and the range of recognition Rr of the roadside camera 103 can be associated with the position on the high-precision three-dimensional map data. The position of installation Pr of the roadside camera 103 indicates the position of the origin of the coordinate system in the space of recognition of the roadside camera 103. The directions of the three axes of the coordinate system are identified by the position of the origin together with the data regarding the directions of imaging. In a case where the position of installation Pr of the roadside camera 103 differs from the position of the origin of the coordinate system in the space of recognition of the roadside camera 103, data regarding relation between the position of installation Pr of the roadside camera 103 and the position of the origin may be acquired together. The data regarding the range of recognition Rr of the roadside camera 103 may include at least data regarding a maximum distance from the position of installation Pr of the roadside camera 103.

The data to be acquired from the parked vehicle 100 regarding the object recognition result may include data regarding the kind of the detected object and the coordinate position of the object in the space of recognition of the random vehicle object recognition system. Moreover, the data to be acquired from the parked vehicle 100 regarding the object recognition result may include the data indicating the kind of the surrounding environment sensor, i.e., the classification such as a camera, LiDAR, a radar sensor such as millimeter wave radar, and an ultrasonic sensor. Furthermore, the data to be acquired from the parked vehicle 100 regarding the object recognition result may include data that allows for identification of a position of an origin Pc1 of the coordinate system in the space of recognition of the random vehicle object recognition system, a direction of recognition, and a range of recognition Rc1. The position of the origin Pc1 of the coordinate system in the space of recognition of the random vehicle object recognition system and the direction of recognition may be, for example, a relative position and a relative direction to the position and the direction of the relevant parked vehicle 100. In this case, if the position and the direction of the parked vehicle 100 on the map data are obtained, it is possible to identify, on the map data, the position of the origin Pct of the coordinate system in the space of recognition of the random vehicle object recognition system and the direction of recognition. The data regarding the position and the direction of the parked vehicle 100 on the map data may be included in the data to be acquired from the parked vehicle 100 regarding the recognition result, or may be obtained on the basis of the relative position and the direction of the parked vehicle 100 with respect to the vehicle 10. The data regarding the range of recognition Rc1 of the random vehicle object recognition system may include at least data regarding a maximum distance from the position of the origin Pc1 of the coordinate system in the space of recognition of the random vehicle object recognition system.

Similarly, the data to be acquired from the oncoming vehicle 101 regarding the object recognition result may include data that allows for identification of the kind of the detected object, the coordinate position of the object in the space of recognition of the random vehicle object recognition system, the kind of the surrounding environment sensor, a position of an origin Pc2 of the coordinate system in the space of recognition of the random vehicle object recognition system, a direction of recognition, and a range of recognition Rc2.

Referring back to FIG. 7, thereafter, the blind spot certainty calculation unit 69 of the processor 51 carries out processing of calculating the certainty of the recognition result of the presence or the absence of the passer-by in the blind spot region on the basis of the object recognition results by the external object recognition systems acquired by the object recognition data acquisition unit 67 (step S19). FIG. 8 is a flowchart illustrating the processing of calculating the certainty of the recognition result of the presence or the absence of the passer-by.

First, the blind spot certainty calculation unit 69 calculates the blind spot certainty Ad of the entire blind spot region (step S31). In one example, on the basis of the data regarding the object recognition result acquired from each of the external object recognition system, the blind spot certainty calculation unit 69 makes conversion of the range of recognition of each of the external object recognition systems, from the coordinate system of the relevant external object recognition system into the coordinate system of the vehicle object recognition system. Moreover, the blind spot certainty calculation unit 69 obtains the overlap region where the range of recognition of each of the external object recognition systems overlaps with the blind spot region. Furthermore, the blind spot certainty calculation unit 69 separates off the blind spot region into the subregions by the number of the object recognition systems recognizing each of the subregions, and calculates the blind spot certainty Ad on the basis of the number of the object recognition systems recognizing each of the subregions and the area ratio of each of the subregions.

FIG. 11 illustrates the ranges of recognition of the random vehicle object recognition system of the parked vehicle 100, the random vehicle object recognition system of the oncoming vehicle 101, and the roadside camera 103, and the blind spot region D in the example illustrated in FIG. 10. In the example illustrated in FIG. 11, the area ratio R3 of the subregion where the ranges of recognition of the three object recognition systems overlap with the blind spot region D is 50%. The area ratio R2 of the subregion where the ranges of recognition of the two object recognition systems overlap with the blind spot region D is 15%. The area ratio R1 of the subregion where the range of recognition of the one object recognition system overlaps with the blind spot region D is 15%. The area ratio of the subregion where no ranges of recognition of the object recognition systems overlap with the blind spot region D is 20%.

In this case, in accordance with the example illustrated in FIG. 4, the blind spot certainty E1 of the subregion where the range of recognition of the one object recognition system overlaps with the blind spot region D is set to 50. The blind spot certainty E2 of the subregion where the ranges of recognition of the two object recognition systems overlap with the blind spot region D is set to 70. The blind spot certainty E3 of the subregion where the ranges of recognition of the three object recognition systems overlap with the blind spot region D is set to 80. Thus, the blind spot certainty Ad of the entire blind spot region D is given as follows, by the expression (1) mentioned above.

$$Ad = 80 \times 0.5 + 70 \times 0.15 + 50 \times 0.15 = 58$$

Thereafter, the blind spot certainty calculation unit 69 determines whether or not any passers-by have been detected in the blind spot region as viewed from the vehicle 10 by any of the external object recognition systems (step S33). In one example, the blind spot certainty calculation unit 69 extracts data regarding a recognition result of a region corresponding to the blind spot region as viewed from the vehicle 10, from the data regarding the recognition result by each of the external object recognition systems, and determines whether or not any passers-by have been detected in the blind spot region. For example, on the basis of the data regarding the object recognition result acquired from each of the external object recognition systems, the blind spot certainty calculation unit 69 extracts data regarding a recognition result of a region where the range of recognition of each of the external object recognition system overlaps with the blind spot region. Thus, the blind spot certainty calculation unit 69 determines whether or not any passers-by have been detected in the blind spot region.

In a case where no passers-by have been detected in the blind spot region (S33/No), the flow proceeds directly to step S37. In a case where a passer-by has been detected in the blind spot region (S33/Yes), the blind spot certainty calculation unit 69 links the same passer-by and performs the numbering of each passer-by, to obtain the number of the object recognition systems recognizing each passer-by (step S35).

In the example illustrated in FIG. 11, it is assumed that a first passer-by Hw1 is detected by the random vehicle object recognition system of the parked vehicle 100, the random vehicle object recognition system of the oncoming vehicle 101, and the roadside camera 103. It is assumed that a second passer-by Hw2 is detected solely by the roadside camera 103.

In this case, as for the first passer-by, the passer-by detected by the random vehicle object recognition system of the parked vehicle 100, the passer-by detected by the random vehicle object recognition system of the oncoming vehicle 101, and the passer-by detected by the roadside camera 103 are located within a predetermined distance in the coordinate system of the vehicle object recognition system. Accordingly, the blind spot certainty calculation unit 69 determines that the random vehicle object recognition system of the parked vehicle 100, the random vehicle object recognition system of the oncoming vehicle 101, and the roadside camera 103 have detected the same passer-by, and performs the numbering of the relevant passer-by as the first passer-by Hw1. Moreover, as for the second passer-by, the blind spot certainty calculation unit 69 performs the numbering of the passer-by detected solely by the roadside camera 103 as the second passer-by Hw2. The blind spot certainty calculation unit 69 records the number of the object recognition systems that recognize the first passer-by Hw1 as three. The blind spot certainty calculation unit 69 records the number of the object recognition systems that recognize the second passer-by Hw2 as one. Furthermore, in this embodiment, the blind spot certainty calculation unit 69 also records the data regarding the kinds of the surrounding environment sensors included in the data regarding the recognition results obtained from the random vehicle object recognition system of the parked vehicle 100, the random vehicle object recognition system of the oncoming vehicle 101, and the roadside camera 103.

Referring back to FIG. 8, thereafter, the blind spot certainty calculation unit 69 calculates the passer-by recognition certainty Ah in the blind spot region (step S35). The blind spot certainty calculation unit 69 calculates the passer-by recognition certainty Ah for each passer-by on the basis of, at least, the number of the object recognition systems recognizing the relevant passer-by. The passer-by recognition certainty Ah may be indicated by, for example, a numerical value of 0 to 100 both inclusive. Alternatively, the passer-by recognition certainty Ah may be classified into multiple levels, e.g., high, medium, and low.

Let us apply the example of the passer-by recognition certainty Ah illustrated in FIG. 5 to the example illustrated in FIG. 11. The first passer-by Hw1 is recognized by the three object recognition systems. Accordingly, the passer-by recognition certainty Ah1 for the first passer-by Hw1 is "70". The second passer-by Hw2 is recognized by the one object recognition system. Accordingly, the passer-by recognition certainty Ah2 for the second passer-by Hw2 is "50".

The blind spot certainty calculation unit 69 may correct the passer-by recognition certainty Ah on the additional basis of the data regarding the kinds of the surrounding environment sensors of the object recognition systems that recognize each of the first passer-by Hw1 and the second passer-by Hw2. In this case, a correction value may be set in accordance with the kind of the surrounding environment sensor provided in each of the object recognition systems and the distance from the surrounding environment sensor to each passer-by, to correct the passer-by recognition certainty Ah.

Let us apply the example of the correction values summarized in FIG. 6 to the example illustrated in FIG. 11. In a case where the random vehicle object recognition systems of the parked vehicle 100 and the oncoming vehicle 101 respectively include a camera and LiDAR, it is assumed that the correction value of the passer-by recognition certainty for the first passer-by Hw1 by the random vehicle object recognition system of the parked vehicle 100 is "20". It is assumed that the correction value of the passer-by recognition certainty for the first passer-by Hw1 by the random vehicle object recognition system of the oncoming vehicle 101 is "10". It is assumed that the correction value of the passer-by recognition certainty for the first passerby Hw1 by the roadside camera 103 is "20". It is assumed that the correction value of the passer-by recognition certainty for the second passer-by Hw2 by the roadside camera 103 is "10". In this case, the passer-by recognition certainty Ah1 for the first passer-by Hw1 is "90", inclusive of the correction value "20" added. The passer-by recognition certainty Ah2 for the second passer-by Hw2 is "60", inclusive of the correction value "10" added.

Thereafter, the blind spot certainty calculation unit 69 determines, for each passer-by, whether or not the passer-by is a newly detected passer-by in the current calculation cycle (step S39). Whether or not the passer-by is a newly detected passer-by may be determined on the basis of, for example, presence or absence of the currently detected passer-by within an assumed range of movement based on a direction of movement and a speed of movement of a passer-by detected in a previous calculation cycle. However, there is no particular limitation on the method of determining whether or not the passer-by is a newly detected passer-by in the current calculation cycle.

In a case where the passer-by is a newly detected passer-by in the current calculation cycle (S39/Yes), the blind spot certainty calculation unit 69 records the calculated passer-by recognition certainty Ah for each passer-by, together with numbering data (step S41). In a case where the passer-by is not a newly detected passer-by in the current calculation cycle (S39/No), the blind spot certainty calculation unit 69 records a maximum value among values of the passer-by recognition certainty Ah calculated in the current and previous calculation cycles for the same passer-by, together with the numbering data (step S43). That is, the maximum value of the passer-by recognition certainty Ah is maintained in a period after the determination as to the presence of the passer-by in the blind spot region D until the vehicle 10 passes by the blind spot region D, that is, until it is determined that there is no risk of collision between the passer-by and the vehicle 10.

Thus, it is possible to prevent reduction in the possibility of the presence of the passer-by in the past, in a case where, for example, the oncoming vehicle passes by and the passer-by is no longer recognized by the random vehicle object recognition system of the oncoming vehicle, or in a case where, for example, any of the object recognition systems lowers in accuracy of recognition and no longer recognizes the passer-by.

Referring back to FIG. 7, thereafter, in step S21, the countermeasure unit 71 determines the contents of the processing of reducing the risk of collision between the vehicle 10 and the passer-by on the basis of the passer-by recognition certainty Ah and the blind spot certainty Ad calculated by the blind spot certainty calculation unit 69 (step S21).

Figures 12, 13:
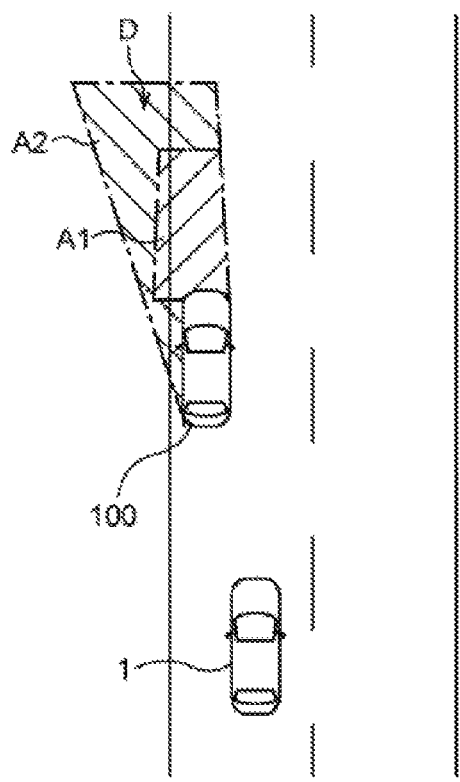
FIG. 12 is a table summarizing a setting example of contents of countermeasures to be taken to reduce a risk of collision.
FIG. 13 is a diagram illustrating an example where the blind spot region is separated off into multiple subregions to make the contents of the countermeasures different.

FIG. 12 summarizes an example of a method of setting the contents of the processing of reducing the risk of collision between the vehicle 10 and the passer-by. In the example summarized in FIG. 12, the passer-by recognition certainty Ah is classified into three groups: smaller than 50; 50 to 70 both inclusive; and 71 or more. The blind spot certainty Ad is classified into two groups: 50 or smaller; and 51 or more. For each classification, setting is provided as to whether or not the notification processing is done, and whether or not a travel control correction is done. In one example, in a case where the passer-by recognition certainty Ah is 71 or more, the certainty of the presence of the relevant passer-by Hw is considerably high. Accordingly, the countermeasure unit 71 performs the notification processing regardless of the blind spot certainty Ad, and intervenes in a travel control, to provide setting to correct the travel control.

In a case where the passer-by recognition certainty Ah is 50 to 70 both inclusive, possibility of the presence of the relevant passer-by Hw is relatively high. Accordingly, the countermeasure unit 71 provides setting to perform the notification processing regardless of the blind spot certainty Ad. In a case where the passer-by recognition certainty Ah is 50 to 70 both inclusive and the blind spot certainty Ad is 51 or more, the passer-by recognition certainty Ah is highly reliable, and the possibility of the presence of the passer-by Hw is plausibly high. Thus, the countermeasure unit 71 additionally intervenes in the travel control and provides the setting to correct the travel control. In a case where the passer-by recognition certainty Ah is 50 to 70 both inclusive, and the blind spot certainty Ad is 50 or smaller, the passer-by recognition certainty Ah is relatively less reliable, and the possibility of the absence of the passer-by Hw is plausible. Thus, the countermeasure unit 71 provides setting to refrain from intervening in the travel control. However, even in the case without the intervention in the traveling control, when the passer-by recognition certainty Ah is relatively high, the notification processing is carried out. This leads to careful driving about the blind spot region D by the driver who drives the vehicle 10.

In a case where the passer-by recognition certainty Ah is 50 or smaller, and the blind spot certainty Ad is 51 or more, the possibility of the presence of the passerby Hw is low. Accordingly, the countermeasure unit 71 provides setting to refrain from both the notification processing and the intervention in the travel control. In a case where the passer-by recognition certainty Ah is 50 or smaller, and the blind spot certainty Ad is 50 or smaller, the passer-by recognition certainty Ah is low but the reliability of the passer-by recognition certainty Ah is low. Accordingly, in consideration of the possibility of the presence of the unrecognized passer-by Hw, the countermeasure unit 71 performs the notification processing and provides setting to intervene in the travel control and correct the travel control.

It is to be noted that the setting of the contents of the countermeasures summarized in FIG. 12 is merely an example. The classification of the passer-by recognition certainty Ah and the blind spot certainty Ad, and the contents of the countermeasures may be set in any other ways. For example, possibility of a rush out toward ahead of the vehicle 10 differs depending on a location of the passer-by Hw in the blind spot region D. Accordingly, the countermeasure unit 71 may set the contents of the countermeasures in accordance with the location of the passer-by Hw in the blind spot region D. For example, as illustrated in FIG. 13, the blind spot region D may be separated off into a subregion A1 and a subregion A2. The subregion A1 is close to the vehicle 10 and has a short distance to a planned track ahead of the vehicle 10. The subregion A2 is far from the vehicle 10 or has a long distance to the planned track ahead of the vehicle 10. The contents of the countermeasures may be set in accordance with the subregions A1 and A2.

FIG. 14 summarizes a setting example in which a degree of intervention in the travel control is made different in accordance with to the location of the passer-by Hw in the blind spot region D. In the example summarized in FIG. 14, the contents of the travel control in the case where the passer-by Hw is present in the subregion A1 are set to provide further reduction in the risk of collision, as compared to the case where the passer-by Hw is present in the subregion A2. The subregion A1 is close to the vehicle 10 and has the short distance to the planned track ahead of the vehicle 10. The subregion A2 is far from the vehicle 10 or has the long distance to the planned track ahead of the vehicle 10.

Referring back to FIG.7, thereafter, in a case with the setting to carry out the notification processing, the countermeasure unit 71 transmits a command signal to the notification device 45, allowing the notification device 45 to give an alarm to the driver by, for example, image display or sound output, to make the driver aware of the presence of the passer-by in the blind spot region D (step S23). In the case where the travel control is corrected as a control of reducing the risk of collision, the countermeasure unit 71 may notify the driver that the travel control is corrected because of high possibility of the presence of the passer-by Hw in the blind spot region D. This makes it possible to prevent the driver from feeling uncomfortable when a change occurs in the travel of the vehicle 10.

In a case where the driver assistance system 1 is a system configured to establish communication between the driver assistance apparatus 50 and a portable device or a wearable device of the passer-by Hw, e.g., a smartphone, the countermeasure unit 71 may transmit a command signal to, for example, the portable device of the passer-by Hw to give an alarm to the passer-by Hw. This makes it possible to give the passer-by Hw a notification that the vehicle 10 is approaching. Hence, it is possible to prevent the passer-by Hw from rushing out of the blind spot region D toward ahead of the vehicle 10.

In a case with the setting to refrain from performing the notification processing, the processor 51 skips step S23.

Thereafter, with the setting to correct the travel control, the countermeasure unit 71 transmits a command signal to the vehicle control device 40, and carries out the processing of correcting the travel control to reduce the risk of collision between the vehicle 10 and the passer-by who may be possibly present in the blind spot region D (step S25). In one example, the countermeasure unit 71 transmits the command signal to the vehicle control device 40 to decelerate the vehicle 10 or change a steering angle to allow the vehicle 10 to pass through a position away from the blind spot region D. In a case where the vehicle 10 is in the manual driving, the vehicle control device 40 intervenes in a driving operation of the vehicle 10 to automatically decelerate the vehicle 10 or to automatically change the steering angle. In a case where the vehicle 10 is in the automated driving, the vehicle control device 40 corrects a requested acceleration rate or a requested deceleration rate, or a target steering angle to decelerate the vehicle 10 or change the steering angle.

Whether to decelerate the vehicle 10 or whether to change the steering angle of the vehicle 10, or an amount of the deceleration or an amount of change in the steering angle may be set as appropriate in accordance with, for example, the current vehicle speed and the steering angle of the vehicle 10, and the distance from the blind spot region D.

Thereafter, the blind spot region detection unit 65 determines whether or not the vehicle 10 has passed by the blind spot region D (step S27). For example, the blind spot region detection unit 65 may determine that the vehicle 10 has passed by the blind spot region D in a case where the detected blind spot region D is no longer detected. Alternatively, the blind spot region detection unit 65 may determine that the vehicle 10 has passed by the blind spot region D on the basis of the positional data regarding the vehicle 10 and the high-precision three-dimensional map data. There is no particular limitation on the method of determining whether or not the vehicle 10 has passed by the blind spot region D.

In a case where the vehicle 10 has not passed by the blind spot region D (S27/No), the processor 51 causes the flow to return to step S17 and repeatedly carries out the processing of steps described above. In a case where the vehicle 10 has passed by the blind spot region D (S27/Yes), the processor 51 determines whether or not the on-vehicle system has stopped (step S29). In a case where the on-vehicle system has not stopped (S29/No), the processor 51 causes the flow to return to step S13 and repeatedly carries out the processing of steps described above. In a case where the on-vehicle system has stopped (S29/Yes), the processor 51 ends the driver assistance processing.

As described, in the driver assistance system according to this embodiment, in the case where the blind spot region as viewed from the vehicle to be assisted is detected, the data regarding the object recognition results is acquired from the external object recognition systems other than the vehicle object recognition system of the relevant vehicle to be assisted, to acquire the data regarding the presence or the absence of a passer-by in the blind spot region. Moreover, in the driver assistance system, the certainty of the recognition result of the presence or the absence of the passer-by in the blind spot region is calculated on the basis of, at least, the number of the object recognition systems that recognize the same passer-by. In accordance with the certainty calculated, the processing of reducing the risk of collision between the vehicle to be assisted and the passers-by. Hence, it is possible to prevent repetitive deceleration or repetitive correction of the track in spite of the absence of any passers-by in the blind spot region. This makes it possible to prevent reliability and acceptability of the system from being lowered, and prevent driver assistance from being unutilized.

Moreover, in the driver assistance system according to this embodiment, the processing of reducing the risk of collision between the vehicle to be assisted and the passer-by is carried out, with the use of the blind spot certainty together with the passer-by recognition certainty. The blind spot certainty is the certainty of data regarding recognition of the entire blind spot region. The passer-by recognition certainty is the certainty of the recognition results of the passer-by by the external object recognition systems. Thus, the processing of reducing the risk of collision between the vehicle to be assisted and the passer-by is carried out in additional consideration of the reliability of the passer-by recognition certainty. This leads to further enhancement of the effects described above.

Furthermore, in the driver assistance system according to this embodiment, the passer-by recognition certainty is calculated on the additional basis of the kind of the surrounding environment sensor provided in the external object recognition system. This makes it possible to calculate the passer-by recognition certainty that reflects detection accuracy or reliability of each of the surrounding environment sensors, leading to further enhancement of the effects described above.

In addition, in the driver assistance system according to this embodiment, as the number of the external object recognition systems that have detected the same passer-by becomes larger, the passer-by recognition certainty becomes higher. The processing of reducing the risk of collision is carried out, while maintaining the certainty of the presence of the relevant passer-by, in the period after the time of the identification of the passer-by until it is determined that there is no risk of collision between the relevant passer-by and the vehicle to be assisted. Hence, it is possible to prevent the reduction in the possibility of the presence of the passer-by in the past, even in the case where the oncoming vehicle has passed by and the passer-by is no longer recognized by the random vehicle object recognition system of the oncoming vehicle, or in the case where, for example, any of the object recognition systems lowers in accuracy of recognition and no longer recognizes the passer-by.

Although some example embodiments of the disclosure have been described in the foregoing by way of example with reference to the accompanying drawings, the disclosure is by no means limited to the embodiments described above. It should be appreciated that modifications and alterations may be made by persons skilled in the art without departing from the scope as defined by the appended claims. The disclosure is intended to include such modifications and alterations in so far as they fall within the scope of the appended claims or the equivalents thereof.

For example, let us consider a case where the blind spot forming object that forms the blind spot region is an object with high possibility that someone is hanging around the object. In such a case, in calculating the passer-by recognition certainty, a correction may be made to raise the passer-by recognition certainty. In one example, the blind spot forming object is a vehicle such as a taxi, a bus, or a truck that delivers luggage, possibility is high that someone is hanging around such a vehicle. In such a case, making the correction to raise the passer-by recognition certainty makes it possible to raise certainty of a determination as to actual presence of a passer-by detected by the external object recognition system. Hence, it is possible to carry out appropriately the control of reducing the risk of collision between the vehicle and the passer-by.

Moreover, in the forgoing example embodiments, the constituent elements of the driver assistance apparatus are mounted on the vehicle. However, the constituent elements of the driver assistance apparatus may be mounted on, for example, a parked vehicle as the blind spot forming object. Alternatively, the constituent elements of the driver assistance apparatus may be mounted on, for example, a server communicably coupled to various object recognition systems through wireless communication.

As used herein, the term "collision" may be used interchangeably with the term "contact".

As described, according to the aspects of the disclosure, it is possible to carry out assistance processing in accordance with certainty of object recognition with respect to a blind spot region.

The processor 51 illustrated in FIG. 3 is implementable by circuitry including at least one semiconductor integrated circuit such as at least one processor (e.g., a central processing unit (CPU)), at least one application specific integrated circuit (ASIC), and/or at least one field programmable gate array (FPGA). At least one processor is configurable, by reading instructions from at least one machine readable non-transitory tangible medium, to perform all or a part of functions of the processor 51. Such a medium may take many forms, including, but not limited to, any type of magnetic medium such as a hard disk, any type of optical medium such as a CD and a DVD, any type of semiconductor memory (i.e., semiconductor circuit) such as a volatile memory and a non-volatile memory. The volatile memory may include a DRAM and a SRAM, and the nonvolatile memory may include a ROM and a NVRAM. The ASIC is an integrated circuit (IC) customized to perform, and the FPGA is an integrated circuit designed to be configured after manufacturing in order to perform, all or a part of the functions of the processor 51 illustrated in FIG. 3.

The invention claimed is:

1. A driver assistance system configured to assist in driving a vehicle, the driver assistance system comprising:
   one or more processors; and
   one or more memories communicably coupled to the one or more processors, wherein
   the one or more processors are configured to:
      acquire data regarding presence of a passer-by in a blind spot region as viewed from the vehicle, the passer-by in the blind spot region being identified based on, at least, recognition results by object recognition systems including one or more external object recognition systems other than a vehicle-mounted object recognition system, wherein each object recognition system includes a sensor;
      determine how many external object recognition systems of the one or more external object recognition systems detect the passer-by in the blind spot region;
      calculate a recognition certainty for the presence of the passer-by based on, at least, how many external object recognition systems detect the passer-by in the blind spot region; and
      carry out processing of reducing a risk of collision between the vehicle and the passer-by, in accordance with the recognition certainty calculated,
   wherein the one or more processors are further configured to:
      determine ranges of recognition of the object recognition systems that overlap with the blind spot region;
      segment the blind spot region into subregions based on how many object recognition systems covering each part of the blind spot region;
      assign predefined values to the subregion depending on how many object recognition systems cover each subregion and obtain a ratio of each subregion to the blind spot region as a whole; and
      calculate, using each assigned predefined value and each ratio related to respective one of the subregions, a recognition certainty for the blind spot region; and
      carry out the processing of reducing the risk of collision between the vehicle and the passer-by in accordance with the calculated recognition certainty for the blind spot region in addition to the calculated recognition certainty for the presence of the passer-by.

2. The driver assistance system according to claim 1, wherein the one or more processors are configured to:
   raise the recognition certainty for the presence of the passer-by as a number of the object recognition systems which detect the same passer-by increases; and
   maintain the recognition certainty for the presence of the passer-by and carry out the processing of reducing the risk of collision during a period after the passer-by is identified, until determining that there is no risk of collision between the passer-by and the vehicle.

3. The driver assistance system according to claim 2, wherein
   the one or more processors are configured to calculate the recognition certainty additionally based on kinds of surrounding environment sensors of the respective object recognition systems.

4. The driver assistance system according to claim 1, wherein
   the one or more processors are configured to set contents of the processing of reducing the risk of collision, based on a location of the passer-by on a condition that the detected passer-by is present in the blind spot region.

5. A non-transitory computer-readable recording medium containing a program applicable to a driver assistance system configured to assist in driving a vehicle,
the program causing, when executed by one or more processors, the one or more processors to implement processing, the processing comprising:
acquire data regarding presence of a passer-by in a blind spot region as viewed from the vehicle, the passer-by in the blind spot region being identified based on, at least, recognition results by object recognition systems including one or more external object recognition systems other than a vehicle-mounted object recognition system, wherein each object recognition system includes a sensor;
determine how many external object recognition systems of the one or more external object recognition systems detect the passer-by in the blind spot region;
calculating a recognition certainty for the presence of the passer-by based on, at least, how many external object recognition systems detect the passer-by in the blind spot region; and
carrying out processing of reducing a risk of collision between the vehicle to be assisted and the passer-by, in accordance with the recognition certainty calculated,
wherein, when calculating the recognition certainty for the presence of the passer-by, the one or more processors are further configured to:
assign a base certainty value to the passer-by based on how many external object recognition systems detect the passer-by in the blind spot; and
adjust the assigned base certainty value based on predefined values assigned to sensors included in the external object recognition systems to obtain the recognition certainty for the presence of the passer-by.

6. A driver assistance system configured to assist in driving a vehicle, the driver assistance system comprising:
one or more processors; and
one or more memories communicably coupled to the one or more processors, wherein
the one or more processors are configured to:
acquire data regarding presence of a passer-by in a blind spot region as viewed from the vehicle, the passer-by in the blind spot region being identified based on, at least, recognition results by object recognition systems including one or more external object recognition systems other than a vehicle-mounted object recognition system, wherein each object recognition system includes a sensor;
determine how many external object recognition systems of the one or more external object recognition systems detect the passer-by in the blind spot region;
calculate a recognition certainty for the presence of the passer-by based on, at least, how many external object recognition systems detect the passer-by in the blind spot region; and
carry out processing of reducing a risk of collision between the vehicle and the passer-by, in accordance with the recognition certainty calculated,
wherein, when calculating the recognition certainty for the presence of the passer-by, the one or more processors are further configured to:
assign a base certainty value to the passer-by based on how many external object recognition systems detect the passer-by in the blind spot; and
adjust the assigned base certainty value based on predefined values assigned to sensors included in the external object recognition systems to obtain the recognition certainty for the presence of the passer-by.

7. The driver assistance system according to claim 6, wherein the one or more processors are further configured to adjust the assigned base certainty value based on a distance between the passer-by and each sensor in addition to the predefined values assigned to the sensors included in the external object recognition systems.

8. The driver assistance system according to claim 6, wherein the one or more processors are further configured to:
determine ranges of recognition of the object recognition systems that overlap with the blind spot region;
segment the blind spot region into subregions based on how many object recognition systems covering each part of the blind spot region;
assign predefined values to the subregion depending on how many object recognition systems cover each subregion and obtain a ratio of each subregion to the blind spot region as a whole; and
calculate, using each assigned predefined value and each ratio related to respective one of the subregions, a recognition certainty for the blind spot region and
carry out the processing of reducing the risk of collision between the vehicle and the passer-by in accordance with the calculated recognition certainty for the blind spot region in addition to the calculated recognition certainty for the presence of the passer-by.

9. The driver assistance system according to claim 8, wherein the one or more processors are further configured to determine whether to notify a driver of the presence of the passer-by in the blind spot region and whether to control the vehicle to avoid the passer-by in the blind spot region for carrying out the processing of reducing the risk of collision, based on (1) the calculated recognition certainty for the presence of the passer-by and (2) the calculated recognition certainty for the blind spot region.

10. The driver assistance system according to claim 8, wherein the one or more processors are further configured to determine whether to notify a driver of the presence of the passer-by in the blind spot region and whether to control the vehicle to avoid the passer-by in the blind spot region for carrying out the processing of reducing the risk of collision, based on (1) the calculated recognition certainty for the presence of the passer-by, (2) the calculated recognition certainty for the blind spot region, and (3) a location of the passer-by in the blind spot region.

* * * * *